US012787106B2

(12) United States Patent
Inoue et al.

(10) Patent No.: US 12,787,106 B2
(45) Date of Patent: Nov. 3, 2026

(54) TERMINAL APPARATUS, METHOD, AND INTEGRATED CIRCUIT

(71) Applicant: Sharp Kabushiki Kaisha, Sakai City (JP)

(72) Inventors: Kyosuke Inoue, Sakai City (JP); Shohei Yamada, Sakai City (JP); Hidekazu Tsuboi, Sakai City (JP); Takuma Kawano, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 220 days.

(21) Appl. No.: 18/849,599

(22) PCT Filed: Mar. 22, 2023

(86) PCT No.: PCT/JP2023/011296
§ 371 (c)(1),
(2) Date: Sep. 23, 2024

(87) PCT Pub. No.: WO2023/189963
PCT Pub. Date: Oct. 5, 2023

(65) Prior Publication Data

US 2025/0203700 A1 Jun. 19, 2025

(30) Foreign Application Priority Data

Mar. 30, 2022 (JP) ................................ 2022-055642

(51) Int. Cl.
*H04W 76/27* (2018.01)
*H04W 16/28* (2009.01)

(52) U.S. Cl.
CPC .......... *H04W 76/27* (2018.02); *H04W 16/28* (2013.01)

(58) Field of Classification Search
CPC .............................. H04W 76/27; H04W 16/28
See application file for complete search history.

(56) References Cited

U.S. PATENT DOCUMENTS

| | | | | |
|---|---|---|---|---|
| 2024/0073984 | A1* | 2/2024 | Wu | H04W 76/19 |
| 2024/0388931 | A1* | 11/2024 | Kim | H04L 5/0023 |
| 2025/0007596 | A1* | 1/2025 | Wallentin | H04B 7/06964 |

OTHER PUBLICATIONS

"3rd Generation Partnership Project; Technical Specification Group Radio Access Network; NR; NR and NG-RAN Overall Description; Stage 2 (Release 16)", 3GPP TS 38.300 V16.4.0, Dec. 2020, 149 pages.

(Continued)

*Primary Examiner* — Melvin C Marcelo
(74) *Attorney, Agent, or Firm* — Keating & Bennett, LLP

(57) ABSTRACT

A MAC entity of a terminal apparatus provides an indication indicating a beam failure in the PSCell to an RRC entity of the terminal apparatus, in a case that a value of BFI_COUNTER of a PSCell is equal to or greater than a first parameter and an SCG is deactivated, based on a determination of whether the beam failure in the PSCell has been indicated to the RRC entity since a last reconfiguration of a BFD-RS of the PSCell by the RRC entity, and a determination that the beam failure in the PSCell has not been indicated to the RRC entity since the last reconfiguration of the BFD-RS of the PSCell by the RRC entity, and the first parameter is a threshold configured by a base station apparatus and used in beam failure detection.

3 Claims, 13 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300 V16.4.0, Dec. 2020, 391 pages.
"3rd Generation Partnership Project; Technical Specification Group Radio Access Network; NR; Radio Resource Control (RRC) protocol specification (Release 16)", 3GPP TS 38.331 V16.3.1, Jan. 2021, 932 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.3.0, Dec. 2020, 1084 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.4.0, Dec. 2020, 84 pages.
"3rd Generation Partnership Project; Technical Specification Group Radio Access Network; NR; Medium Access Control (MAC) protocol specification (Release 16)", 3GPP TS 38.321 V16.3.0, Dec. 2020, 156 pages.
Vivo, "Introduction of eDCCA", 3GPP TSG-RAN WG2 Meeting #117-e, R2-2204211, Feb. 21-Mar. 3, 2022, 24 pages.

* cited by examiner

```
CellGroupConfig ::=                SEQUENCE {
        <PARTLY OMITTED>
    spCellConfig                SpCellConfig        OPTIONAL,
        <PARTLY OMITTED>
}
SpCellConfig ::=                   SEQUENCE {
        <PARTLY OMITTED>
    deactivatedSCG-Config-r17                SetupRelease { DeactivatedSCG-Config-r17 }        OPTIONAL,
    tci-Info-r17                TCI-Info        OPTIONAL,
        <PARTLY OMITTED>
}
DeactivatedSCG-Config-r17 ::=            SEQUENCE {
   bfd-and-RLM                           BOOLEAN,
   ...
}
```

FIG. 7

```
      <OMITTED>
SCG-Configuration-r12 ::=          CHOICE {
   release                         NULL,
   setup                        SEQUENCE {
      scg-ConfigPartMCG-r12            SEQUENCE {
         scg-Counter-r12                  INTEGER (0.. 65535)       OPTIONAL,
         powerCoordinationInfo-r12        PowerCoordinationInfo-r12 OPTIONAL,
         ...
      }                                              OPTIONAL,
      scg-ConfigPartSCG-r12            SCG-ConfigPartSCG-r12      OPTIONAL
   }
}
   <PARTLY OMITTED>
SCG-ConfigPartSCG-r12 ::=          SEQUENCE {
   radioResourceConfigDedicatedSCG-r12    RadioResourceConfigDedicatedSCG-r12  OPTIONAL,
   sCellToReleaseListSCG-r12          SCellToReleaseList-r10     OPTIONAL,
   pSCellToAddMod-r12                 PSCellToAddMod-r12            OPTIONAL,
   sCellToAddModListSCG-r12           SCellToAddModList-r10      OPTIONAL,
   mobilityControlInfoSCG-r12       MobilityControlInfoSCG-r12 OPTIONAL,
   <PARTLY OMITTED>
}
   <OMITTED>
```

FIG. 8

TERMINAL APPARATUS, METHOD, AND INTEGRATED CIRCUIT

TECHNICAL FIELD

The present invention relates to a terminal apparatus, a method, and an integrated circuit.

This application claims priority to JP 2022-55642 filed on Mar. 30, 2022, the contents of which are incorporated herein by reference.

BACKGROUND ART

In the 3rd Generation Partnership Project (3GPP; tradename) being a standardization project for cellular mobile communication systems, technical study and standardization have been carried out regarding cellular mobile communication systems including that for radio access, core networks, services, and the like.

For example, technical study and standardization of Evolved Universal Terrestrial Radio Access (E-UTRA) have begun in the 3GPP regarding a Radio Access Technology (RAT) for cellular mobile communication systems for the 3.9th generation and the 4th generation. Technical study and standardization of enhanced technology of E-UTRA are still being carried out in the 3GPP. Note that E-UTRA may also be referred to as Long Term Evolution (LTE: trade name), and its enhanced technology may also be referred to as LTE-Advanced (LTE-A) and LTE-Advanced Pro (LTE-A Pro).

In addition, technical study and standardization of New Radio or NR Radio access (NR) have begun in the 3GPP as a Radio Access Technology (RAT) for cellular mobile communication systems for the 5th generation (5G). Technical study and standardization of enhanced technology of NR are still being carried out in the 3GPP.

CITATION LIST

Non Patent Literature

NPL 1: 3GPP TS 38.300 v16.4.0, "NR; NR and NG-RAN Overall description; Stage 2" pp. 10-134

NPL 2: 3GPP TS 36.300 v16.4.0, "Evolved Universal Terrestrial Radio Access (E-UTRA) and Evolved Universal Terrestrial Radio Access Network (E-UTRAN); Overall description; Stage 2" pp. 19-362

NPL 3: 3GPP TS 38.331 v16.3.1, "NR; Radio Resource Control (RRC); Protocol specifications" pp. 21-881

NPL 4: 3GPP TS 36.331 v16.3.0, "Evolved Universal Terrestrial Radio Access (E-UTRA); Radio Resource Control (RRC); Protocol specifications" pp. 25-1015

NPL 5: 3GPP TS 37.340 v16.4.0, "Evolved Universal Terrestrial Radio Access (E-UTRA) and NR; Multi-Connectivity; Stage 2" pp. 7-77

NPL 6: 3GPP TS 38.321 v16.3.0, "NR; Medium Access Control (MAC) protocol specification" pp. 8-152

NPL 7: R2-2204211, "Introduction of eDCCA"

SUMMARY OF INVENTION

Technical Problem

As an enhanced technology of NR intended to enable high-capacity data communication, there is a dual connectivity (also referred to as multi-connectivity) technology in which one or multiple base station apparatuses and a terminal apparatus communicate with each other using multiple cell groups. In order to perform communication in each of the cell groups in dual connectivity, the terminal apparatus needs to monitor whether there is a message addressed to the terminal apparatus itself in each of the cell groups. In order to enable the terminal apparatus to perform communication with low latency when communication of a large amount of data takes place, the terminal apparatus needs to continuously monitor multiple cell groups, which leads to consumption of a large amount of power. Therefore, technical study has begun on a technology for less frequently monitoring some cell groups or stopping monitoring (a cell group deactivation technology).

NPL 7 is about a Change Request (CR) proposal of the MAC specification created based on the specification details agreed on so far. However, based on the current CR proposal, MAC does not work properly when beam failure is detected multiple times after deactivation of a cell group.

An aspect of the present invention has been made in view of the circumstances described above, and has an object to provide a terminal apparatus, a base station apparatus, a communication method, and an integrated circuit that enable efficient communication control.

Solution to Problem

In order to accomplish the object described above, an aspect of the present invention is contrived to provide the following means. That is, an aspect of the present invention is a terminal apparatus for communicating with a base station apparatus, the terminal apparatus including a processing unit that performs communication by using an MCG and an SCG, and a transmitter that transmits signaling to the base station apparatus, in which the SCG includes at least a PSCell, the processing unit performs processing at a MAC entity and processing at an RRC entity, the MAC entity provides an indication of a beam failure in the PSCell to an RRC entity, in a case that a value of BFI_COUNTER of the PSCell is equal to or greater than a first parameter and the SCG is deactivated, based on a determination of whether the beam failure in the PSCell has been indicated to the RRC entity since a last reconfiguration of a BFD-RS of the PSCell by the RRC entity, and a determination that the beam failure in the PSCell has not been indicated to the RRC entity since the last reconfiguration of the BFD-RS of the PSCell by the RRC entity, the RRC entity initiates transmission of signaling indicating SCG failure information to the base station apparatus, based on a determination of whether the indication has been received from the MAC entity, and a determination that the indication has been received from the MAC entity, and the first parameter is a threshold configured by the base station apparatus and used in beam failure detection.

In addition, an aspect of the present invention is a method for a terminal apparatus for communicating with a base station apparatus, the method including performing communication by using an MCG and an SCG, in which the SCG includes at least a PSCell, a MAC entity of the terminal apparatus provides an indication of a beam failure in the PSCell to an RRC entity of the terminal apparatus, in a case that a value of BFI_COUNTER of the PSCell is equal to or greater than a first parameter and the SCG is deactivated, based on a determination of whether the beam failure in the PSCell has been indicated to the RRC entity since a last reconfiguration of a BFD-RS of the PSCell by the RRC entity, and a determination that the beam failure in the PSCell has not been indicated to the RRC entity since the last reconfiguration of the BFD-RS of the PSCell by the RRC entity, the RRC entity initiates transmission of signaling indicating SCG failure information to the base station apparatus, based on a determination of whether the indication has been received from the MAC entity, and a determination that the indication has been received from the MAC entity, and the first parameter is a threshold configured by the base station apparatus and used in beam failure detection.

In addition, an aspect of the present invention is an integrated circuit mounted on a terminal apparatus for communicating with a base station apparatus, the integrated circuit performing communication by using an MCG and an SCG, in which the SCG includes at least a PSCell, the integrated circuit causes the terminal apparatus to provide indications of providing, by a MAC entity of the terminal apparatus, an indication of a beam failure in the PSCell to a RRC entity of the terminal apparatus, in a case that a value of BFI_COUNTER of the PSCell is equal to or greater than a first parameter and the SCG is deactivated, based on a determination of whether the beam failure in the PSCell has been indicated to the RRC entity since a last reconfiguration of a BFD-RS of the PSCell by the RRC entity, and a determination that the beam failure in the PSCell has not been indicated to the RRC entity since the last reconfiguration of the BFD-RS of the PSCell by the RRC entity, and initiating, by the RRC entity, transmission of signaling indicating SCG failure information to the base station apparatus, based on a determination of whether the indication has been received from the MAC entity, and a determination that the indication has been received from the MAC entity, and the first parameter is a threshold configured by the base station apparatus and used in beam failure detection.

In addition, an aspect of the present invention is a base station apparatus for communicating with a terminal apparatus, the base station apparatus including a processing unit that performs communication by using an MCG and an SCG and a receiver that receives signaling from the terminal apparatus, in which the SCG includes at least a PSCell, in a case that a value of BFI_COUNTER of the PSCell is equal to or greater than beamFailureInstanceMaxCount and the SCG is deactivated, the processing unit causes a MAC entity of the terminal apparatus to determine whether a condition of the value of the BFI_COUNTER being equal to or greater than the beamFailureInstanceMaxCount is satisfied and whether a beam failure in the PSCell has been indicated to an RRC entity of the terminal apparatus, and causes the MAC entity of the terminal apparatus to provide an indication indicating the beam failure in the PSCell to the RRC entity of the terminal apparatus based on a determination by the MAC entity of the terminal apparatus that the condition of the value of the BFI_COUNTER being equal to or greater than the beamFailureInstanceMaxCount is satisfied and that the beam failure in the PSCell has not been indicated to the RRC entity of the terminal apparatus, and the processing unit causes the RRC entity of the terminal apparatus to determine whether the indication has been received from the MAC entity of the terminal apparatus, and receives signaling indicating SCG failure information from the terminal apparatus based on a determination by the RRC entity of the terminal apparatus that the indication has been received from the MAC entity of the terminal apparatus.

Further, these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the method, and the integrated circuit can implement efficient communication control processing.

BRIEF DESCRIPTION OF DRAWINGS

FIG. 7 is an example of an ASN.1 notation included in a message related to reconfiguration of RRC connection in NR according to the present embodiment.

FIG. 8 is an example of an ASN.1 notation included in a message related to reconfiguration of RRC connection in E-UTRA according to the present embodiment.

DESCRIPTION OF EMBODIMENTS

The present embodiment will be described below in detail with reference to the drawings.

LTE (and LTE-A or LTE-A Pro) and NR may be defined as different Radio Access Technologies (RATs). In addition, NR may be defined as a technology included in LTE. In addition, LTE may be defined as a technology included in NR. In addition, LTE that is connectible to NR by using Multi Radio Dual Connectivity (MR-DC) may be distinguished from existing LTE. In addition, LTE using the 5GC as a Core Network (CN) may be distinguished from existing LTE using an EPC as a core network. Note that existing LTE may refer to LTE in which a technology standardized in release 15 or later versions of the 3GPP is not implemented. The present embodiment may be applied to NR, LTE and another RAT. Although terms associated with LTE and NR are used in the following description, the present embodiment may be applied to other technologies using other terms. In addition, in the present embodiment, the term “E-UTRA” may be replaced with the term “LTE”, and the term “LTE” may be replaced with “E-UTRA”.

Further, although terms of each node and entity, processing in each node and entity, and the like in a case that the radio access technology is E-UTRA or NR will be described in the present embodiment, the present embodiment may be used for another radio access technology. The terms of each node and entity in the present embodiment may be other terms.

Figure 1:
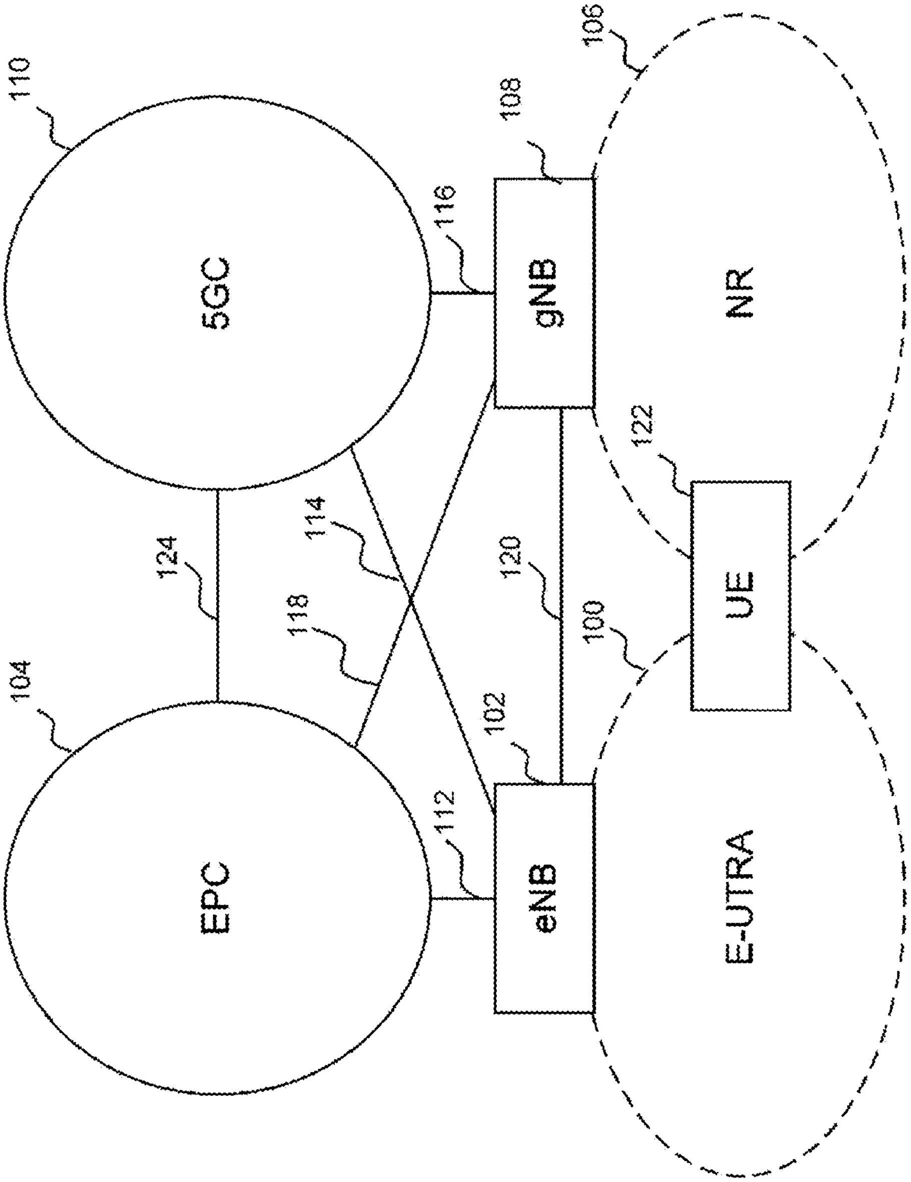
FIG. 1 is a schematic diagram of a communication system according to the present embodiment.

FIG. 1 is a schematic diagram of a communication system according to the present embodiment. Further, functions of each node, radio access technology, core network, and interface to be described with reference to FIG. 1 are a part of functions closely related to the present embodiment, and other functions may be provided.

E-UTRA 100 may be of a radio access technology. In addition, the E-UTRA 100 may be an air interface between UE 122 and an eNB 102. The air interface between the UE 122 and the eNB 102 may be referred to as a Uu interface. The E-UTRAN Node B (eNB) 102 may be a base station apparatus of the E-UTRA 100. The eNB 102 may have an E-UTRA protocol to be described below. The E-UTRA protocol may include an E-UTRA User Plane (UP) protocol to be described below and an E-UTRA Control Plane (CP) protocol to be described below. The eNB 102 may terminate the E-UTRA User Plane (UP) protocol and the E-UTRA Control Plane (CP) protocol for the UE 122. A radio access network including the eNB may be referred to as an E-UTRAN.

An Evolved Packet Core (EPC) 104 may be a core network. An interface 112 is an interface between the eNB 102 and the EPC 104, and may be referred to as an SI interface. The interface 112 may include a control plane interface through which a control signal passes and/or a user plane interface through which user data passes. The control plane interface of the interface 112 may be terminated at a Mobility Management Entity (MME) (not illustrated) in the EPC 104. The user plane interface of the interface 112 may be terminated at a serving gateway (S-GW) (not illustrated) in the EPC 104. The control plane interface of the interface 112 may be referred to as an S1-MME interface. The user plane interface of the interface 112 may be referred to as an S1-U interface.

Further, one or multiple eNBs 102 may be connected to the EPC 104 via the interface 112. Among the multiple eNBs 102 connected to the EPC 104, an interface may be present (not illustrated). The interface between the multiple eNBs 102 connected to the EPC 104 may be referred to as an X2 interface.

NR 106 may be of a radio access technology. In addition, the NR 106 may be an air interface between the UE 122 and a gNB 108. The air interface between the UE 122 and the gNB 108 may be referred to as a Uu interface. The g Node B (gNB) 108 may be a base station apparatus of the NR 106. The gNB 108 may have an NR protocol to be described below. The NR protocol may include an NR User Plane (UP) protocol to be described below and an NR Control Plane (CP) protocol to be described below. The gNB 108 may terminate the NR User Plane (UP) protocol and the NR Control Plane (CP) protocol for the UE 122.

A 5GC 110 may be a core network. An interface 116 is an interface between the gNB 108 and the 5GC 110, and may be referred to as an NG interface. The interface 116 may include a control plane interface through which a control signal passes and/or a user plane interface through which user data passes. The control plane interface of the interface 116 may be terminated by an Access and Mobility management Function (AMF) (not illustrated) in the 5GC 110. The user plane interface of the interface 116 may be terminated at a User Plane Function (UPF) (not illustrated) in the 5GC 110. The control plane interface of the interface 116 may be referred to as an NG-C interface. The user plane interface of the interface 116 may be referred to as an NG-U interface.

Further, one or multiple gNBs 108 may be connected to the 5GC 110 via the interface 116. An interface may be present (not illustrated) between the multiple gNBs 108 connected to the 5GC 110. The interface between the multiple gNBs 108 connected to the 5GC 110 may be referred to as an Xn interface.

The eNB 102 may have a function of connecting to the 5GC 110. The eNB 102 having the function of connecting to the 5GC 110 may be referred to as an ng-eNB. An interface 114 is an interface between the eNB 102 and the 5GC 110, and may be referred to as an NG interface. The interface 114 may include a control plane interface through which a control signal passes and/or a user plane interface through which user data passes. The control plane interface of the interface 114 may be terminated at an AMF in the 5GC 110. The user plane interface of the interface 114 may be terminated at a UPF in the 5GC 110. The control plane interface of the interface 114 may be referred to as an NG-C interface. The user plane interface of the interface 114 may be referred to as an NG-U interface. A radio access network including the ng-eNB or the gNB may be referred to as an NG-RAN. The NG-RAN, the E-UTRAN, or the like may be simply referred to as a network. In addition, the network may include an eNB, an ng-eNB, a gNB, and the like.

Further, one or multiple eNBs 102 may be connected to the 5GC 110 via the interface 114. An interface may be present (not illustrated) between the multiple eNBs 102 connected to the 5GC 110. The interface between the multiple eNBs 102 connected to the 5GC 110 may be referred to as an Xn interface. In addition, the eNB 102 connected to the 5GC 110 and the gNB 108 connected to the 5GC 110 may be connected on an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated at an S-GW (not illustrated) in the EPC 104. The user plane interface of the interface 118 may be referred to as an S1-U interface. In addition, the eNB 102 connected to the EPC 104 and the gNB 108 connected to the EPC 104 may be connected on the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface that allows only the CP, only the UP, or both of the CP and the UP to pass therethrough. In addition, some or all of the interface 114, the interface 116, the interface 118, the interface 120, the interface 124, and the like may be absent depending on a communication system provided by a communication provider or the like.

The UE 122 may be a terminal apparatus that can receive system information and a paging message transmitted from the eNB 102 and/or the gNB 108. In addition, the UE 122 may be a terminal apparatus that can establish a radio connection to the eNB 102 and/or the gNB 108. In addition, the UE 122 may be a terminal apparatus that can simultaneously establish a radio connection to the eNB 102 and a radio connection to the gNB 108. The UE 122 may have the E-UTRA protocol and/or the NR protocol. Further, a radio connection may be a Radio Resource Control (RRC) connection.

In addition, the UE 122 may be a terminal apparatus that can connect to the EPC 104 and/or the 5GC 110 via the eNB 102 and/or the gNB 108. In a case that a connection destination core network of the eNB 102 and/or the gNB 108 with which the UE 122 performs communication is the EPC 104, each Data Radio Bearer (DRB) established between the UE 122 and the eNB 102 and/or the gNB 108 to be described below may further be uniquely associated with each Evolved Packet System (EPS) bearer passing through the EPC 104. Each EPS bearer may be identified with an EPS bearer identity (ID). In addition, the same QoS may be ensured for data, such as an IP packet and an Ethernet (trade name) frame, which passes through the same EPS bearer.

In addition, in a case that the connection destination core network of the eNB 102 and/or the gNB 108 with which the UE 122 performs communication is the 5GC 110, each DRB established between the UE 122 and the eNB 102 and/or the gNB 108 may further be associated with one of Packet Data Unit (PDU) sessions established in the 5GC 110. Each PDU session may include one or multiple QoS flows. Each DRB may be mapped to one or multiple QoS flows, or may be mapped to none of the QoS flows. Each PDU session may be identified with a PDU session identity (ID). In addition, each QoS flow may be identified with a QoS flow identity (ID). In addition, the same QoS may be ensured for data, such as an IP packet and an Ethernet frame, which passes through the same QoS flow.

The EPC 104 may include no PDU sessions and/or QoS flows. In addition, the 5GC 110 may include no EPS bearer. When the UE 122 is connected to the EPC 104, the UE 122 may have information of the EPS bearer(s) but may not have information of the PDU session(s) and/or the QoS flow(s). In addition, when the UE 122 is connected to the 5GC 110, the UE 122 may have information of the PDU session(s) and/or the QoS flow(s) but may not have information of the EPS bearer(s).

Further, in the following description, the eNB 102 and/or the gNB 108 is also simply referred to as a base station apparatus, and the UE 122 is also simply referred to as a terminal apparatus or UE.

Figure 2:
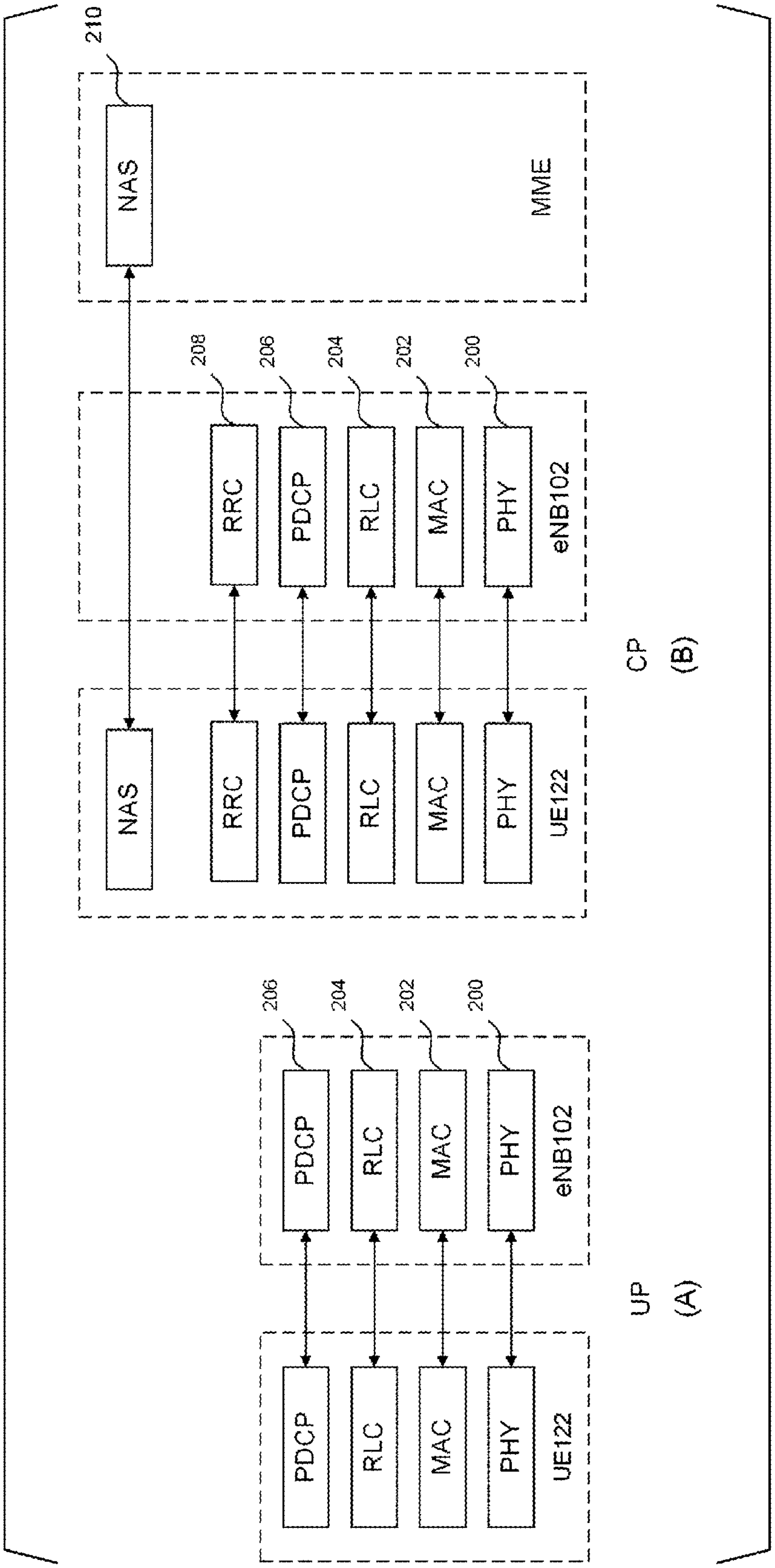
FIG. 2 is a diagram of an example of an E-UTRA protocol structure according to the present embodiment.
Figure 3:
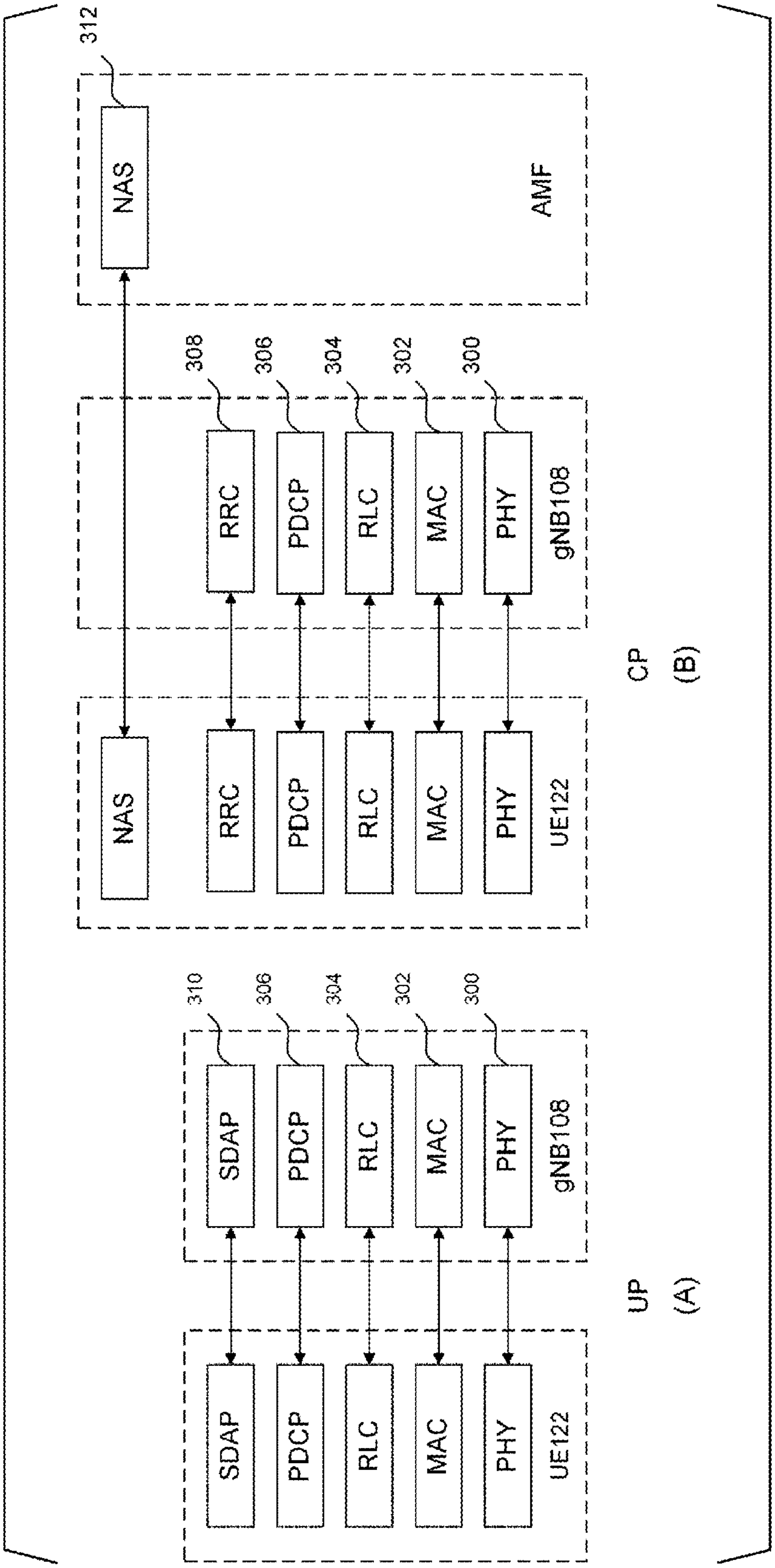
FIG. 3 is a diagram of an example of an NR protocol structure according to the present embodiment.

FIG. 2 is a diagram of an example of an E-UTRA protocol architecture according to the present embodiment. In addition, FIG. 3 is a diagram of an example of an NR protocol architecture according to the present embodiment. Further, functions of each protocol to be described with reference to FIG. 2 and/or FIG. 3 are a part of functions closely related to the present embodiment, and other functions may be provided. Further, in the present embodiment, uplink (UL) may be a link from the terminal apparatus to the base station apparatus. In addition, in the present embodiment, downlink (DL) may be a link from the base station apparatus to the terminal apparatus.

FIG. 2(A) is a diagram of an E-UTRA user plane (UP) protocol stack. As illustrated in FIG. 2(A), the E-UTRAN UP protocol may be a protocol between the UE 122 and the eNB 102. In other words, the E-UTRAN UP protocol may be a protocol terminated at the eNB 102 on the network side. As illustrated in FIG. 2(A), the E-UTRA user plane protocol stack may include a Physical layer (PHY) 200 which is a radio physical layer, a Medium Access Control (MAC) 202 which is a medium access control layer, a Radio Link Control (RLC) 204 which is a radio link control layer, and a Packet Data Convergence Protocol (PDCP) 206 which is a packet data convergence protocol layer.

FIG. 3(A) is a diagram of an NR user plane (UP) protocol stack. As illustrated in FIG. 3(A), the NR UP protocol may be a protocol between the UE 122 and the gNB 108. In other words, the NR UP protocol may be a protocol terminated at the gNB 108 on the network side. As illustrated in FIG. 3(A), the E-UTRA user plane protocol stack may include a PHY 300 which is a radio physical layer, a MAC 302 which is a medium access control layer, an RLC 304 which is a radio link control layer, a PDCP 306 which is a packet data convergence protocol layer, and a Service Data Adaptation Protocol (SDAP) 310 which is a service data adaptation protocol layer.

FIG. 2(B) is a diagram of an E-UTRA Control Plane (CP) protocol architecture. As illustrated in FIG. 2(B), in the E-UTRAN CP protocol, a Radio Resource Control (RRC) 208 being a radio resource control layer may be a protocol between the UE 122 and the eNB 102. In other words, the RRC 208 may be a protocol terminated at the eNB 102 on the network side. In addition, in the E-UTRAN CP protocol, a Non Access Stratum (NAS) 210 being a non Access Stratum (AS) layer (non AS layer) may be a protocol between the UE 122 and the MME. In other words, the NAS 210 may be a protocol terminated at the MME on the network side.

FIG. 3(B) is a diagram of an NR Control Plane (CP) protocol architecture. As illustrated in FIG. 3(B), in the NR CP protocol, an RRC 308 being a radio resource control layer may be a protocol between the UE 122 and the gNB 108. In other words, the RRC 308 may be a protocol terminated at the gNB 108 on the network side. In addition, in the E-UTRAN CP protocol, a NAS 312 being a non AS layer may be a protocol between the UE 122 and the AMF. In other words, the NAS 312 may be a protocol terminated at the AMF on the network side.

Further, the Access Stratum (AS) layer may be a layer terminated between the UE 122 and the eNB 102 and/or the gNB 108. In other words, the AS layer may be a layer including a part or all of the PHY 200, the MAC 202, the RLC 204, the PDCP 206, and the RRC 208, and/or a layer including a part or all of the PHY 300, the MAC 302, the RLC 304, the PDCP 306, the SDAP 310, and the RRC 308.

Further, in the present embodiment, terms such as a PHY (PHY layer), a MAC (MAC layer), an RLC (RLC layer), a PDCP (PDCP layer), an RRC (RRC layer), and a NAS (NAS layer) may be hereinafter used, without distinguishing the protocol of E-UTRA and the protocol of NR from each other. In this case, the PHY (PHY layer), the MAC (MAC layer), the RLC (RLC layer), the PDCP (PDCP layer), the RRC (RRC layer), and the NAS (NAS layer) may be the PHY (PHY layer), the MAC (MAC layer), the RLC (RLC layer), the PDCP (PDCP layer), the RRC (RRC layer), and the NAS (NAS layer) of the E-UTRA protocol, or may be the PHY (PHY layer), the MAC (MAC layer), the RLC (RLC layer), the PDCP (PDCP layer), the RRC (RRC layer), and the NAS (NAS layer) of the NR protocol, respectively. In addition, the SDAP (SDAP layer) may be the SDAP (SDAP layer) of the NR protocol.

In addition, in a case that the protocol of E-UTRA and the protocol of NR are distinguished from each other in the present embodiment, the PHY 200, the MAC 202, the RLC 204, the PDCP 206, and the RRC 208 may be hereinafter referred to as PHY for E-UTRA or PHY for LTE, MAC for E-UTRA or MAC for LTE, RLC for E-UTRA or RLC for LTE, PDCP for E-UTRA or PDCP for LTE, and RRC for E-UTRA or RRC for LTE, respectively. In addition, the PHY 200, the MAC 202, the RLC 204, the PDCP 206, and the RRC 208 may be referred to as E-UTRA PHY or an LTE PHY, E-UTRA MAC or LTE MAC, E-UTRA RLC or LTE RLC, E-UTRA PDCP or LTE PDCP, E-UTRA RRC or LTE RRC, and the like, respectively. In addition, in a case that the protocol of E-UTRA and the protocol of NR are distinguished from each other, the PHY 300, the MAC 302, the RLC 304, the PDCP 306, and the RRC 308 may be referred to as PHY for NR, MAC for NR, RLC for NR, RLC for NR, and RRC for NR, respectively. In addition, the PHY 200, the MAC 302, the RLC 304, the PDCP 306, and the RRC 308 may be referred to as NR PHY, NR MAC, NR RLC, NR PDCP, NR RRC, and the like, respectively.

Entities in the AS layer of E-UTRA and/or NR will be described. An entity having a part or all of functions of the MAC layer may be referred to as a MAC entity. An entity having a part or all of functions of the RLC layer may be referred to as an RLC entity. An entity having a part or all of functions of the PDCP layer may be referred to as a PDCP entity. An entity having a part or all of functions of the SDAP layer may be referred to as an SDAP entity. An entity having a part or all of functions of the RRC layer may be referred to as an RRC entity. The MAC entity, the RLC entity, the PDCP entity, the SDAP entity, and the RRC entity may be rephrased as MAC, RLC, PDCP, SDAP, and RRC, respectively.

Further, data provided from the MAC, the RLC, the PDCP, and the SDAP to a lower layer, and/or data provided to the MAC, the RLC, the PDCP, and the SDAP from a lower layer may be referred to as a MAC Protocol Data Unit (PDU), an RLC PDU, a PDCP PDU, and an SDAP PDU, respectively. In addition, data provided to the MAC, the RLC, the PDCP, and the SDAP from a higher layer, and/or data provided from the MAC, the RLC, the PDCP, and the SDAP to a higher layer may be referred to as a MAC Service Data Unit (SDU), an RLC SDU, a PDCP SDU, and an SDAP SDU, respectively. In addition, a segmented RLC SDU may be referred to as an RLC SDU segment.

Here, the base station apparatus and the terminal apparatus exchange (transmit and/or receive) signals with each other in higher layers. For example, the base station apparatus and the terminal apparatus may transmit and/or receive a Radio Resource Control (RRC) message (also referred to as RRC information or RRC signaling) in an RRC layer. In addition, in a Medium Access Control (MAC) layer, the base station apparatus and the terminal apparatus may transmit and/or receive a MAC control element. Additionally, the RRC layer of the terminal apparatus acquires system information broadcast from the base station apparatus. In this regard, the RRC message, the system information, and/or the MAC control element are also referred to as higher layer signaling or a higher layer parameter. Each of the parameters included in higher layer signaling received by the terminal apparatus may be referred to as a higher layer parameter. Since a higher layer means a higher layer as viewed from the PHY layer in processing of the PHY layer, it may include one or multiple of the MAC layer, the RRC layer, the RLC layer, the PDCP layer, the Non Access Stratum (NAS) layer, and the like. For example, in the processing of the MAC layer, a higher layer may include one or multiple of the RRC layer, the RLC layer, the PDCP layer, the NAS layer, and the like. Hereinafter, "A is given (provided) in a higher layer" or "A is given (provided) by a higher layer" may mean that a higher layer (mainly the RRC layer, the MAC layer, or the like) of the terminal apparatus receives A from the base station apparatus, and that the received A is given (provided) from a higher layer of the terminal apparatus to the physical layer of the terminal apparatus. For example, "a higher layer parameter being provided" in the terminal apparatus may mean that higher layer signaling is received from the base station apparatus, and a higher layer parameter included in the received higher layer signaling is provided from the higher layer of the terminal apparatus to the physical layer of the terminal apparatus 1. A higher layer parameter being configured for the terminal apparatus may mean that the higher layer parameter is given (provided) to the terminal apparatus. For example, a higher layer parameter being configured for the terminal apparatus may mean that the terminal apparatus receives higher layer signaling from the base station apparatus and configures the received higher layer parameter in the higher layer. However, a higher layer parameter being configured for the terminal apparatus may include a default parameter given in advance being configured in the higher layer of the terminal apparatus. In describing transmission of an RRC message from the terminal apparatus to the base station apparatus, an expression that a message is submitted from an RRC entity of the terminal apparatus to a lower layer may be used. In the terminal apparatus, "submitting a message to a lower layer" from the RRC entity may mean submitting a message to the PDCP layer. "Submitting a message to a lower layer" from the RRC layer by the terminal apparatus may mean submitting a message of RRC to a PDCP entity corresponding to each SRB (SRB0, SRB1, SRB2, SRB3, etc.) since the message is transmitted using the SRB. When the RRC entity of the terminal apparatus receives an indication from the lower layer, the lower layer may refer to one or more of the PHY layer, the MAC layer, the RLC layer, the PDCP layer, and the like.

An example of the functions of the PHY will be described. The PHY of the terminal apparatus may have a function of receiving data transmitted from the PHY of the base station apparatus via a downlink (DL) physical channel. The PHY of the terminal apparatus may have a function of transmitting data to the PHY of the base station apparatus via an uplink (UL) physical channel. The PHY may be connected to an upper MAC on a transport channel. The PHY may deliver data to the MAC via the transport channel. In addition, the PHY may be provided with data from the MAC via the transport channel. In order to identify various pieces of control information, a Radio Network Temporary Identifier (RNTI) may be used in the PHY.

Here, physical channels will be described. The physical channels used for radio communication between the terminal apparatus and the base station apparatus may include the following physical channels.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH may be used to broadcast system information required by the terminal apparatus.

In addition, the PBCH may be used to broadcast time indexes (SSB-Indexes) within the periodicity of Synchronization Signal Blocks (SSBs) in NR.

The PDCCH may be used to transmit (or carry) Downlink Control Information (DCI) in downlink radio communication (radio communication from the base station apparatus to the terminal apparatus). Here, one or multiple pieces of DCI (which may be referred to as DCI formats) may be defined for transmission of the downlink control information. In other words, a field for the downlink control information may be defined as DCI and may be mapped to information bits. The PDCCH may be transmitted in PDCCH candidates. The terminal apparatus may monitor a set of PDCCH candidates in a serving cell. Monitoring a set of PDCCH candidates may mean attempting to decode the PDCCH in accordance with a certain DCI format. In addition, the terminal apparatus may use a Control Resource Set (CORESET) to monitor a set of PDCCH candidates. The DCI format may be used for scheduling of the PUSCH in the serving cell. The PUSCH may be used for transmission of user data, transmission of RRC messages to be described below, and the like.

The PUCCH may be used to transmit Uplink Control Information (UCI) in uplink radio communication (radio communication from the terminal apparatus to the base station apparatus). Here, the uplink control information may include Channel State Information (CSI) used to indicate a downlink channel state. In addition, the uplink control information may include a Scheduling Request (SR) used for requesting Uplink Shared CHannel (UL-SCH) resources. In addition, the uplink control information may include a Hybrid Automatic Repeat reQuest ACKnowledgement (HARQ-ACK).

The PDSCH may be used to transmit downlink data (Downlink Shared CHannel (DL-SCH)) from the MAC layer. In addition, in a case of downlink, the PDSCH may be used to transmit System Information (SI), a Random Access Response (RAR), and the like.

The PUSCH may be used to transmit uplink data (Uplink Shared CHannel (UL-SCH)) from the MAC layer or to transmit a HARQ-ACK and/or CSI along with the uplink data. In addition, the PUSCH may be used to transmit CSI only or a HARQ-ACK and CSI only. In other words, the PUSCH may be used to transmit UCI only. In addition, the PDSCH or the PUSCH may be used to transmit RRC signaling (also referred to as an RRC message) and a MAC CE. Here, in the PDSCH, RRC signaling transmitted from the base station apparatus may be signaling common to multiple terminal apparatuses in a cell. In addition, the RRC signaling transmitted from the base station apparatus may be dedicated signaling for a certain terminal apparatus (also referred to as dedicated signaling). In other words, terminal apparatus-specific (UE-specific) information may be transmitted through dedicated signaling to a certain terminal apparatus. In addition, the PUSCH may be used to transmit UE capabilities in uplink.

The PRACH may be used for transmitting a random access preamble. The PRACH may be used to indicate an initial connection establishment procedure, a handover procedure, a connection re-establishment procedure, synchronization (timing adjustment) for uplink transmission, and a request for a UL-SCH resource.

An example of the functions of the MAC will be described. The MAC may be referred to as a MAC sublayer. The MAC may have a function of mapping various Logical Channels to their corresponding transport channels. A logical channel may be identified with Logical channel Identity (Logical Channel ID). The MAC may be connected to an upper RLC with a logical channel. The logical channels may be classified into a control channel for transmitting control information and a traffic channel for transmitting user information depending on the type of information to be transmitted. In addition, the logical channels may be classified into an uplink logical channel and a downlink logical channel. The MAC may have a function of multiplexing MAC SDUs belonging to one or multiple different logical channels and providing the multiplexed MAC SDUs to the PHY. In addition, the MAC may have a function of demultiplexing the MAC PDUs provided from the PHY and providing the demultiplexed MAC PDUs to a higher layer via the logical channel to which each MAC SDU belongs. In addition, the MAC may have a function of performing error correction through a Hybrid Automatic Repeat reQuest (HARQ). In addition, the MAC may have a Scheduling Report (SR) function of reporting scheduling information. The MAC may have a function of processing prioritization of terminal apparatuses by using dynamic scheduling. In addition, the MAC may have a function of processing prioritization of logical channels in one terminal apparatus. The MAC may have a function of processing prioritization of resources overlapping in one terminal apparatus. The E-UTRA MAC may have a function of identifying a Multimedia Broadcast Multicast Service (MBMS). In addition, the NR MAC may have a function of identifying a Multicast Broadcast Service (MBS). The MAC may have a function of selecting a transport format. The MAC may have a function of performing Discontinuous Reception (DRX) and/or Discontinuous Transmission (DTX), a function of performing a Random Access (RA) procedure, a Power Headroom Report (PHR) function of providing a notification of information of transmittable power, a Buffer Status Report (BSR) function of giving a notification of data volume information of a transmission buffer, and the like. The NR MAC may have a Bandwidth Adaptation (BA) function. In addition, a MAC PDU format used in the E-UTRA MAC and a MAC PDU format used in the NR MAC may be different from each other. In addition, the MAC PDU may include a MAC Control Element (MAC CE) that is an element for performing control in the MAC.

Uplink (UL) and/or downlink (DL) logical channels used in E-UTRA and/or NR will be described.

A Broadcast Control Channel (BCCH) may be a downlink logical channel for broadcasting control information, such as System Information (SI).

A Paging Control Channel (PCCH) may be a downlink logical channel for carrying a paging message.

A Common Control Channel (CCCH) may be a logical channel for transmitting control information between the terminal apparatus and the base station apparatus. The CCCH may be used in a case that the terminal apparatus does not have RRC connection. In addition, the CCCH may be used between the base station apparatus and multiple terminal apparatuses.

A Dedicated Control Channel (DCCH) may be a logical channel for transmitting dedicated control information in a point-to-point bi-directional manner between the terminal apparatus and the base station apparatus. The dedicated control information may be control information dedicated to each terminal apparatus. The DCCH may be used in a case that the terminal apparatus has RRC connection.

A Dedicated Traffic Channel (DTCH) may be a logical channel for transmitting user data in a point-to-point manner between the terminal apparatus and the base station apparatus. The DTCH may be a logical channel for transmitting dedicated user data. The dedicated user data may be user data dedicated to each terminal apparatus. The DTCH may be present in both uplink and downlink.

Mapping between logical channels and transport channels in uplink in E-UTRA and/or NR will be described.

The CCCH may be mapped to an Uplink Shared Channel (UL-SCH) that is an uplink transport channel.

The DCCH may be mapped to an Uplink Shared Channel (UL-SCH) that is an uplink transport channel.

The DTCH may be mapped to an Uplink Shared Channel (UL-SCH) that is an uplink transport channel.

Mapping between logical channels and transport channels in downlink in E-UTRA and/or NR will be described.

The BCCH may be mapped to a Broadcast Channel (BCH) and/or a Downlink Shared Channel (DL-SCH) that are downlink transport channels.

The PCCH may be mapped to a Paging Channel (PCH) that is a downlink transport channel.

The CCCH may be mapped to a Downlink Shared Channel (DL-SCH) that is a downlink transport channel.

The DCCH may be mapped to a Downlink Shared Channel (DL-SCH) that is a downlink transport channel.

The DTCH may be mapped to a Downlink Shared Channel (DL-SCH) that is a downlink transport channel.

An example of the functions of the RLC will be described. The RLC may be referred to as an RLC sublayer. The E-UTRA RLC may have a function of segmenting (segmentation) and/or concatenating (concatenation) data provided from the PDCP of a higher layer, and providing the segmented and/or concatenated data to a lower position (lower layer). The E-UTRA RLC may have a function of reassembling (reassembly) and re-ordering data provided from a lower layer, and providing the reassembled and re-ordered data to a higher layer. The NR RLC may have a function of assigning data provided from the PDCP of a higher layer with a sequence number independent of a sequence number assigned in the PDCP. In addition, the NR RLC may have a function of segmenting (segmentation) data provided from the PDCP and providing the segmented data to a lower layer. In addition, the NR RLC may have a function of reassembling (reassembly) data provided from a lower layer and providing the reassembled data to a higher layer. In addition, the RLC may have a data retransmission function and/or a data retransmission request function (Automatic Repeat reQuest (ARQ)). In addition, the RLC may have a function of performing error correction by using an ARQ. Control information indicating data required to be retransmitted and that is transmitted from a receiving side to a transmitting side of the RLC in order to perform the ARQ may be referred to as a status report. In addition, a status report transmission indication transmitted from the transmitting side to the receiving side of the RLC may be referred to as a poll. In addition, the RLC may have a function of detecting data duplication. In addition, the RLC may have a function of discarding data. The RLC may have three modes, namely a Transparent Mode (TM), an Unacknowledged Mode (UM), and an Acknowledged Mode (AM). In the TM, segmentation of data received from a higher layer may not be performed, and addition of an RLC header may not be performed. A TM RLC entity may be a uni-directional entity, and may be configured as a transmitting TM RLC entity or as a receiving TM RLC entity. Although segmentation and/or concatenation of data received from a higher layer, addition of an RLC header, and the like may be performed in the UM, retransmission control of data may not be performed. A UM RLC entity may be a uni-directional entity, or may be a bi-directional entity. In a case that the UM RLC entity is a uni-directional entity, the UM RLC entity may be configured as a transmitting UM RLC entity or as a receiving UM RLC entity. In a case that the UM RLC entity is a bi-directional entity, the UM RRC entity may be configured as a UM RLC entity including the transmitting side and the receiving side. In the AM, segmentation and/or concatenation of data received from a higher layer, addition of an RLC header, data retransmission control, and the like may be performed. An AM RLC entity may be a bi-directional entity, and may be configured as an AM RLC including the transmitting side and the receiving side. Further, data provided to a lower layer and/or data provided from a lower layer in the TM may be referred to as a TMD PDU. In addition, data provided to a lower layer and/or data provided from a lower layer in the UM may be referred to as a UMD PDU. In addition, data provided to a lower layer or data provided from a lower layer in the AM may be referred to as an AMD PDU. An RLC PDU format used in the E-UTRA RLC and an RLC PDU format used in the NR RLC may be different from each other. In addition, the RLC PDU may include an RLC PDU for data and an RLC PDU for control. The RLC PDU for data may be referred to as an RLC DATA PDU. In addition, the RLC PDU for control may be referred to as an RLC CONTROL PDU.

An example of the functions of the PDCP will be described. The PDCP may be referred to as a PDCP sublayer. The PDCP may have a function of maintaining sequence numbers. In addition, the PDCP may have a header compression and decompression function for efficiently transmitting user data such as an IP Packet and an Ethernet frame in wireless sections. A protocol used for header compression and decompression for IP packets may be referred to as a Robust Header Compression (ROHC) protocol. In addition, a protocol used for header compression and decompression for Ethernet frames may be referred to as an Ethernet (trade name) Header Compression (EHC) protocol. In addition, the PDCP may have a function of encrypting and decrypting data. In addition, the PDCP may have a function of data integrity protection and integrity verification. In addition, the PDCP may have a function of re-ordering. In addition, the PDCP may have a function of retransmitting a PDCP SDU. In addition, the PDCP may have a function of discarding data by using a discard timer. In addition, the PDCP may have a duplication function. In addition, the PDCP may have a function of discarding data received in a duplicate manner. A PDCP entity may be a bi-directional entity, and may include a transmitting PDCP entity and a receiving PDCP entity. In addition, a PDCP PDU format used in the E-UTRA PDCP and a PDCP PDU format used in the NR PDCP may be different from each other. In addition, the PDCP PDU may include a PDCP PDU for data and a PDCP PDU for control. The PDCP PDU for data may be referred to as a PDCP DATA PDU. In addition, the PDCP PDU for control may be referred to as a PDCP CONTROL PDU.

An example of the functions of the SDAP will be described. The SDAP is a service data adaptation protocol layer. The SDAP may have a function of performing association (mapping) between a downlink QoS flow transmitted from the 5GC 110 to the terminal apparatus via the base station apparatus and a Data Radio Bearer (DRB) and/or mapping between an uplink QoS flow transmitted from the terminal apparatus to the 5GC 110 via the base station apparatus and a DRB. In addition, the SDAP may have a function of storing mapping rule information. In addition, the SDAP may have a function of performing marking of a QoS Flow identity (QoS Flow ID (QFI)). Further, the SDAP PDU may include a SDAP PDU for data and an SDAP PDU for control. The SDAP PDU for data may be referred to as a SDAP DATA PDU. In addition, the SDAP PDU for control may be referred to as a SDAP CONTROL PDU. Further, one SDAP entity of the terminal apparatus may be present for a PDU session.

An example of the functions of the RRC will be described. The RRC may have a broadcast function. The RRC may have a function of paging from the EPC 104 and/or the 5GC 110. The RRC may have a function of paging from the gNB 108 or the eNB 102 connected to the 5GC 110. In addition, the RRC may have an RRC connection management function. In addition, the RRC may have a radio bearer control function. In addition, the RRC may have a cell group control function. In addition, the RRC may have a mobility control function. In addition, the RRC may have a terminal apparatus measurement reporting and terminal apparatus measurement reporting control function. In addition, the RRC may have a QoS management function. In addition, the RRC may have a radio link failure detection and recovery function. The RRC may perform broadcasting, paging, RRC connection management, radio bearer control, cell group control, mobility control, terminal apparatus measurement reporting and terminal apparatus measurement reporting control, QoS management, detection and recovery of radio link failure, and the like by using RRC messages. Further, RRC messages and parameters used in the E-UTRA RRC may be different from RRC messages and parameters used in the NR RRC.

The RRC messages may be transmitted using the BCCH of a logical channel, may be transmitted by using the PCCH of the logical channel, may be transmitted by using the CCCH of the logical channel, or may be transmitted by using the DCCH of the logical channel. In addition, the RRC messages transmitted by using the DCCH may be rephrased as Dedicated RRC signaling or RRC signaling.

In an RRC message transmitted by using the BCCH, for example, a Master Information Block (MIB) may be included, a System Information Block (SIB) of each type may be included, or another RRC message may be included. In an RRC message transmitted by using the PCCH, for example, a paging message may be included, or another RRC message may be included. In an RRC message transmitted in the uplink (UL) direction by using the CCCH, for example, an RRC setup request message (RRC Setup Request), an RRC resumption request message (RRC Resume Request), an RRC reestablishment request message (RRC Reestablishment Request), an RRC system information request message (RRC System Info Request), and the like may be included. In addition, for example, an RRC connection request message (RRC Connection Request), an RRC connection resumption request message (RRC Connection Resume Request), an RRC connection reestablishment request message (RRC Connection Reestablishment Request), and the like may be included. In addition, another RRC message may be included.

In an RRC message transmitted in the downlink (DL) direction by using the CCCH, for example, an RRC connection rejection message (RRC Connection Reject), an RRC connection setup message (RRC Connection Setup), an RRC connection reestablishment message (RRC Connection Reestablishment), an RRC connection reestablishment rejection message (RRC Connection Reestablishment Reject), and the like may be included. In addition, for example, an RRC rejection message (RRC Reject), an RRC setup message (RRC Setup), and the like may be included. In addition, another RRC message may be included.

In RRC signaling transmitted in the uplink (UL) direction by using the DCCH, for example, a measurement report message (Measurement Report), an RRC connection reconfiguration completion message (RRC Connection Reconfiguration Complete), an RRC connection setup completion message (RRC Connection Setup Complete), an RRC connection reestablishment completion message (RRC Connection Reestablishment Complete), a security mode completion message (Security Mode Complete), a UE capability information message (UE Capability Information), and the like may be included. In addition, for example, a measurement report message (Measurement Report), an RRC reconfiguration completion message (RRC Reconfiguration Complete), an RRC setup completion message (RRC Setup Complete), an RRC reestablishment completion message (RRC Reestablishment Complete), an RRC resumption completion message (RRC Resume Complete), a security mode completion message (Security Mode Complete), a UE capability information message (UE Capability Information), and the like may be included. In addition, another RRC signaling may be included.

In RRC signaling transmitted in the downlink (DL) direction by using the DCCH, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like may be included. In addition, for example, an RRC reconfiguration message (RRC Reconfiguration), an RRC resumption message (RRC Resume), an RRC release message (RRC Release), an RRC reestablishment message (RRC Reestablishment), a security mode command message (Security Mode Command), a UE capability enquiry message (UE Capability Enquiry), and the like may be included. In addition, another RRC signaling may be included.

An example of the functions of the NAS will be described. The NAS may have an authentication function. In addition, the NAS may have a function of performing mobility management. In addition, the NAS may have a function of security control.

The functions of the PHY, MAC, RLC, PDCP, SDAP, RRC, and NAS described above are merely an example, and some or all of each of the functions may not be implemented. In addition, some or all of the functions of each layer may be included in another layer.

Next, a state transition of the UE 122 in LTE and NR will now be described. The UE 122 connected to an EPC or a 5GC may be in an RRC_CONNECTED state when an RRC connection has been established. The state in which an RRC connection has been established may include a state in which the UE 122 retains a part or all of UE contexts to be described below. In addition, the state in which an RRC connection has been established may include a state in which the UE 122 can transmit and/or receive unicast data. In addition, regarding the UE 122, when the RRC connection is suspended, the UE 122 may be in an RRC_INACTIVE state. In addition, the UE 122 being in the RRC_INACTIVE state may be the UE 122 being connected to the 5GC and the RRC connection being suspended. In a case that the UE 122 is in neither the RRC_CONNECTED state nor the RRC_INACTIVE state, the UE 122 may be in an RRC_IDLE state.

Note that, in a case that the UE 122 is connected to the EPC, suspension of the RRC connection may be initiated by the E-UTRAN although the UE 122 does not have the RRC_INACTIVE state. In a case that the UE 122 is connected to the EPC and the RRC connection is suspended, the UE 122 may transition to the RRC_IDLE state while retaining an AS context of the UE and an identifier (resumeIdentity) used for resumption (resume). In a case that the UE 122 retains the AS context of the UE and that the E-UTRAN permits the RRC connection to be resumed and that the UE 122 needs to transition from the RRC_IDLE state to the RRC_CONNECTED state, a higher layer (for example, the NAS layer) of the RRC layer of the UE 122 may initiate the resumption of the RRC connection suspended.

The definition of the suspension may vary between the UE 122 connected to the EPC 104 and the UE 122 connected to the 5GC 110. All or some of the procedures for the UE 122 to resume from suspension may be different between a case that the UE 122 is connected to the EPC (the UE 122 is suspended in the RRC_IDLE state) and a case that the UE 122 is connected to the 5GC (the UE 122 is suspended in the RRC_INACTIVE state).

Further, the RRC_CONNECTED state, the RRC_INACTIVE state, and the RRC_IDLE state may be respectively referred to as a connected state (connected mode), a deactivated state (inactive mode), and an idle state (idle mode), or may be respectively referred to as an RRC connected state (RRC connected mode), an RRC deactivated state (RRC inactive mode), and an RRC idle state (RRC idle mode).

AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source (Source), a cell identity (cellIdentity), and a physical cell identity of the PCell of the connection source. Further, the AS context of the UE retained by one or all of the eNB 102 and the gNB 108 may include information identical to that of the AS context of the UE retained by the UE 122, or may include information different from that included in the AS context of the UE retained by the UE 122.

The security context may be information including all or some of an encryption key at an AS level, a Next Hop parameter (NH), a Next Hop Chaining Counter parameter (NCC) used to derive an access key for the next hop, an identifier of an encryption algorithm at a selected AS level, and a counter used for replay protection.

Next, a serving cell will be described. With respect to the terminal apparatus in an RRC connected state in which CA and/or DC to be described below is not configured, a serving cell may include one Primary Cell (PCell). In addition, with respect to the terminal apparatus in the RRC connected state in which CA and/or DC to be described below is configured, multiple serving cells may mean a set of multiple cells including one or more Special Cells (SpCells) and one or more all Secondary Cells (SCells). The SpCell may support PUCCH transmission and contention-based Random Access (CBRA), and the SpCell may be constantly activated. The PCell may be a cell used for an RRC connection establishment procedure when the terminal apparatus in the RRC idle state transitions to the RRC connected state. In addition, the PCell may be a cell used for an RRC connection reestablishment procedure in which the terminal apparatus performs reestablishment of an RRC connection. In addition, the PCell may be a cell used for a random access procedure in a case of handover. The PSCell may be a cell used for the random access procedure in a case that a secondary node to be described below is added. In addition, the SpCell may be a cell used for purposes other than the purposes described above.

A group of serving cells configured for the terminal apparatus including the SpCell and one or more SCells may be considered as carrier aggregation (CA) being configured for the terminal apparatus. In addition, for the terminal apparatus configured with CA, a cell that provides additional radio resources to the SpCell may mean an SCell.

Among groups of serving cells configured by the RRC, a group of serving cells using the same timing reference cell and the same timing advance value for cells configured with uplink may be referred to as a Timing Advance Group (TAG). In addition, a TAG including an SpCell of a MAC entity may mean a Primary Timing Advance Group (PTAG). In addition, a TAG other than the PTAG may mean a Secondary Timing Advance Group (STAG). Further, one or more TAGs may be configured for each cell group to be described below.

A cell group configured for the terminal apparatus by the base station apparatus will be described. The cell group may include one SpCell. In addition, the cell group may include one SpCell and one or multiple SCells. In other words, the cell group may include one SpCell and optionally one or multiple SCells. In addition, the cell group may be expressed as a set of cells.

Dual Connectivity (DC) may be a technology for performing data communication by using radio resources of cell groups configured by each of a first base station apparatus (first node) and a second base station apparatus (second node). In a case that DC or MR-DC to be described below is performed, addition of a cell group may be performed on the terminal apparatus by the base station apparatus. In order to perform DC, the first base station apparatus may add the second base station apparatus. The first base station apparatus may be referred to as a Master Node (MN). In addition, a cell group including master nodes may be referred to as a Master Cell Group (MCG). The second base station apparatus may be referred to as a Secondary Node (SN). In addition, a cell group including secondary nodes may be referred to as a Secondary Cell Group (SCG). Further, a master node and a secondary node may be included in the same base station apparatus.

In addition, in a case that DC is not configured, the cell group configured for the terminal apparatus may be referred to as an MCG. In addition, in the case that DC is not configured, an SpCell configured for the terminal apparatus may be a PCell. In addition, NR in which DC is not configured may be referred to as NR stand-alone.

Further, Multi-Radio Dual Connectivity (MR-DC) may be a technology for performing DC by using E-UTRA for an MCG and NR for an SCG. In addition, MR-DC may be a technology for performing DC by using NR for the MCG and E-UTRA for the SCG. In addition, MR-DC may be a technology for performing DC by using NR for both the MCG and the SCG. MR-DC may be a technology included in DC. As an example of MR-DC using E-UTRA for the MCG and NR for the SCG, there may be E-UTRA-NR Dual Connectivity (EN-DC) using the EPC as a core network, or there may be NG-RAN E-UTRA-NR Dual Connectivity (NGEN-DC) using the 5GC as a core network. In addition, as an example of MR-DC using NR for the MCG and E-UTRA for the SCG, there may be NR-E-UTRA Dual Connectivity (NE-DC) using the 5GC as a core network. In addition, as an example of MR-DC using NR for both of the MCG and the SCG, there may be NR-NR Dual Connectivity (NR-DC) using the 5GC as a core network.

Further, in the terminal apparatus, one MAC entity may be present for each cell group. For example, in a case that DC or MR-DC is configured for the terminal apparatus, one MAC entity may be present for the MCG, and one MAC entity may be present for the SCG. The MAC entity for the MCG in the terminal apparatus may be constantly established for the terminal apparatus in all of the states (the RRC idle state, the RRC connected state, the RRC deactivated state, and the like). In addition, the MAC entity for the SCG in the terminal apparatus may be created by the terminal apparatus in a case that the SCG is configured for the terminal apparatus. In addition, configuration of the MAC entity for each cell group of the terminal apparatus may be performed in a case that the terminal apparatus receives RRC signaling from the base station apparatus. In a case that the MAC entity is associated with an MCG, the SpCell may mean the PCell. In addition, in a case that the MAC entity is associated with an SCG, the SpCell may mean a Primary SCG Cell (PSCell). In addition, in a case that the MAC entity is not associated with the cell group, the SpCell may mean the PCell. The PCell, the PSCell, and the SCell are each a serving cell. In EN-DC and NGEN-DC, the MAC entity for the MCG may be an E-UTRA MAC entity, and the MAC entity for the SCG may be an NR MAC entity. In addition, in NE-DC, the MAC entity for the MCG may be an NR MAC entity, and the MAC entity for the SCG may be an E-UTRA MAC entity. In addition, in NR-DC, the MAC entities for the MCG and the SCG may each be an NR MAC entity. Further, a case that one MAC entity is present for each cell group may be rephrased as a case that one MAC entity is present for each SpCell. In addition, one MAC entity for each cell group may be rephrased as one MAC entity for each SpCell.

Radio bearers will be described. In a case that the terminal apparatus communicates with the base station apparatus, wireless connection may be performed by establishing a Radio Bearer (RB) between the terminal apparatus and the base station apparatus. A radio bearer used for the CP may be referred to as a Signaling Radio Bearer (SRB). In addition, a radio bearer used for the UP may be referred to as a Data Radio Bearer (DRB). Each radio bearer may be assigned a radio bearer identity (ID). A radio bearer identifier for an SRB may be referred to as an SRB identity (SRB ID). A radio bearer identifier for a DRB may be referred to as a DRB identity (DRB ID). For SRBs of E-UTRA, SRB0 to SRB2 may be defined, or SRBs other than these may be defined. For SRBs of NR, SRB0 to SRB3 may be defined, or SRBs other than these may be defined. SRB0 may be an SRB for an RRC message transmitted and/or received using the CCCH of a logical channel. SRB1 may be an SRB for RRC signaling, and for NAS signaling before establishment of SRB2. The RRC signaling transmitted and/or received using SRB1 may include piggybacked NAS signaling. For all of RRC signaling and NAS signaling transmitted and/or received using SRB1, the DCCH of a logical channel may be used. SRB2 may be an SRB for NAS signaling, and for RRC signaling including logged measurement information. For all of RRC signaling and NAS signaling transmitted and/or received using SRB2, the DCCH of a logical channel may be used. In addition, SRB2 may have priority lower than that of SRB1. SRB3 may be an SRB for transmitting and/or receiving specific RRC signaling in a case that EN-DC, NGEN-DC, NR-DC, or the like is configured for the terminal apparatus. For all of RRC signaling and NAS signaling transmitted and/or received using SRB3, the DCCH of a logical channel may be used. Other SRBs may be provided for other purposes. The DRB may be a radio bearer for user data. For RRC signaling transmitted and/or received using the DRB, the DTCH of a logical channel may be used.

Radio bearers of the terminal apparatus will be described. The radio bearers may include an RLC bearer. The RLC bearer may include one or two RLC entities and a logical channel. The RLC entities in a case that an RLC bearer includes two RLC entities may be a transmitting RLC entity and a receiving RLC entity among TM RLC entities and/or RLC entities in a uni-directional UM mode. SRB0 may include one RLC bearer. The RLC bearer of SRB0 may include a TM RLC entity and a logical channel. SRB0 may be constantly established in the terminal apparatus in all of the states (the RRC idle state, the RRC connected state, the RRC deactivated state, and the like). When the terminal apparatus transitions from the RRC idle state to the RRC connected state, one SRB1 may be established and/or configured for the terminal apparatus by using RRC signaling received from the base station apparatus. SRB1 may include one PDCP entity, and one or multiple RLC bearers. The RLC bearer of SRB1 may include an AM RLC entity and a logical channel. One SRB2 may be established and/or configured for the terminal apparatus, using RRC signaling received by the terminal apparatus in the RRC connected state with activated AS security from the base station apparatus. SRB2 may include one PDCP entity, and one or multiple RLC bearers. The RLC bearer of SRB2 may include an AM RLC entity and a logical channel. Further, the PDCP of SRB1 and SRB2 on the base station apparatus side may be deployed in the master node. In a case that a secondary node in EN-DC, NGEN-DC, or NR-DC is added or in a case that a secondary node is changed, one SRB3 may be established and/or configured for the terminal apparatus, using RRC signaling received by the terminal apparatus in the RRC connected state with activated AS security from the base station apparatus. SRB3 may be a direct SRB between the terminal apparatus and the secondary node. SRB3 may include one PDCP entity, and one or multiple RLC bearers. The RLC bearer of SRB3 may include an AM RLC entity and a logical channel. The PDCP of SRB3 on the base station apparatus side may be deployed in the secondary node. One or multiple DRBs may be established and/or configured for the terminal apparatus, using RRC signaling received by the terminal apparatus in the RRC connected state with activated AS security from the base station apparatus. The DRB may include one PDCP entity, and one or multiple RLC bearers. The RLC bearer of the DRB may include AM or UM RLC entities and a logical channel.

Further, in MR-DC, a radio bearer whose PDCP is deployed in a master node may be referred to as an MN terminated bearer. In addition, in MR-DC, a radio bearer whose PDCP is deployed in the secondary node may be referred to as an SN terminated bearer. Further, in MR-DC, a radio bearer whose RLC bearer is present only in the MCG may be referred to as an MCG bearer. In addition, in MR-DC, a radio bearer whose RLC bearer is present only in the SCG may be referred to as an SCG bearer. In addition, in DC, a radio bearer whose RLC bearer is present in both the MCG and the SCG may be referred to as a split bearer.

In a case that MR-DC is configured for the terminal apparatus, a bearer type of SRB1 and SRB2 established/and or configured for the terminal apparatus may be an MN-terminated MCG bearer and/or an MN-terminated split bearer. In addition, in a case that MR-DC is configured for the terminal apparatus, a bearer type of SRB3 established/and or configured for the terminal apparatus may be an SN-terminated SCG bearer. In addition, in a case that MR-DC is configured for the terminal apparatus, a bearer type of DRB established/and or configured for the terminal apparatus may be any one of all bearer types.

The RLC entity established and/or configured for the RLC bearer established and/or configured for the cell group configured in E-UTRA may be the E-UTRA RLC. In addition, the RLC entity established and/or configured for the RLC bearer established and/or configured for the cell group configured in NR may be the NR RLC. In a case that EN-DC is configured for the terminal apparatus, the PDCP entity established and/or configured for the MN-terminated MCG bearer may be either the E-UTRA PDCP or the NR PDCP.

In addition, in a case that EN-DC is configured for the terminal apparatus, the PDCP established and/or configured for the radio bearers of other bearer types, i.e., an MN-terminated split bearer, an MN-terminated SCG bearer, an SN-terminated MCG bearer, an SN-terminated split bearer, and an SN-terminated SCG bearer, may be the NR PDCP. In addition, in a case that NGEN-DC, NE-DC, or NR-DC is configured for the terminal apparatus, the PDCP entity established and/or configured for the radio bearers of all of the bearer types may be the NR PDCP.

Further, in NR, the DRB established and/or configured for the terminal apparatus may be associated with one PDU session. One SDAP entity may be established and/or configured for one PDU session of the terminal apparatus. The SDAP entity, the PDCP entity, the RLC entity, and the logical channel established and/or configured for the terminal apparatus may be established and/or configured by using RRC signaling that the terminal apparatus receives from the base station apparatus.

Further, a network configuration in which the master node is the eNB 102 and the EPC 104 is used as a core network regardless of whether MR-DC is configured may be referred to as E-UTRA/EPC. In addition, a network configuration in which the master node is the eNB 102 and the 5GC 110 is used as a core network may be referred to as E-UTRA/5GC. In addition, a network configuration in which the master node is the gNB 108 and the 5GC 110 is used as a core network may be referred to as NR or NR/5GC. In a case that MR-DC is not configured, the master node described above may indicate the base station apparatus that performs communication with the terminal apparatus.

Next, handover in LTE and NR will be described. A handover may be processing in which the UE 122 in the RRC connected state changes the serving cell from a source SpCell to a target SpCell. A handover may take place when the UE 122 receives RRC signaling indicating a handover from the eNB 102 and/or the gNB 108. The RRC signaling indicating a handover may be a message related to reconfiguration of RRC connection including a parameter indicating handover (for example, an information element named MobilityControlInfo, or an information element named ReconfigurationWithSync). Further, the information element named MobilityControlInfo described above may be rephrased as a mobility control configuration information element, a mobility control configuration, or mobility control information. Further, the information element named ReconfigurationWithSync described above may be rephrased as a reconfiguration with synchronization information element, or a reconfiguration with synchronization. Alternatively, the RRC signaling indicating a handover may be a message (for example, MobilityFromEUTRACommand, or MobilityFromNRCommand) indicating movement to a cell of another RAT. In addition, the handover may be rephrased as a reconfiguration with synchronization (reconfiguration with sync). In addition, conditions that the UE 122 can perform a handover include some of all of a case that AS security is activated, a case that SRB2 has been established, and a case that at least one DRB has been established.

Figure 4:
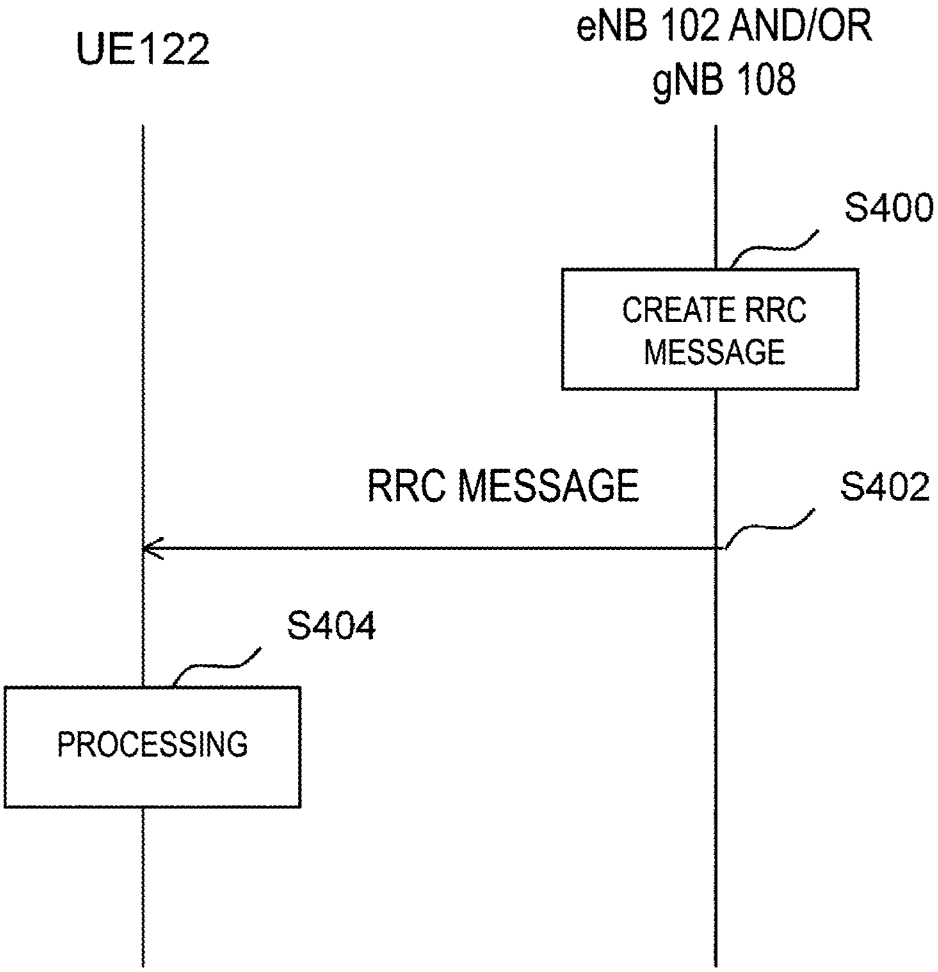
FIG. 4 is a diagram illustrating an example of a flow of a procedure for various configurations in RRC according to the present embodiment.

A flow of RRC signaling transmitted and/or received between the terminal apparatus and the base station apparatus will be described. FIG. 4 is a diagram illustrating an example of the flow of the procedure for various configurations in the RRC according to the present embodiment. FIG. 4 is an example of the flow of a case in which RRC signaling is transmitted from the base station apparatus (eNB 102 and/or gNB 108) to the terminal apparatus (UE 122).

In FIG. 4, the base station apparatus creates an RRC message (step S400). The creation of the RRC message by the base station apparatus may be performed so that the base station apparatus distributes System Information (SI) and a paging message. In addition, the creation of the RRC message by the base station apparatus may be performed to transmit RRC signaling from the base station apparatus for causing a specific terminal apparatus to perform processing. The processing that the specific terminal apparatus is caused to perform may include, for example, processing such as configuration related to security, reconfiguration of an RRC connection, a handover to a different RAT, suspension of an RRC connection, release of an RRC connection, and the like. The processing of reconfiguration of an RRC connection may include, for example, processing such as control (establishment, modification, release, or the like) of a radio bearer, control (establishment, addition, modification, release, or the like) of a cell group, measurement configuration, a handover, security key update, and the like. In addition, the creation of the RRC message by the base station apparatus may be performed for a response to RRC signaling transmitted from the terminal apparatus. The response to RRC signaling transmitted from the terminal apparatus may include, for example, a response to an RRC setup request, a response to an RRC reconnection request, a response to an RRC resumption request, and the like. The RRC message includes information (parameters) for various information notifications and configurations. These parameters may be referred to as fields and/or information elements, and may be notated by using a notation method referred to as Abstract Syntax Notation One (ASN.1).

In FIG. 4, the base station apparatus then transmits created RRC signaling to the terminal apparatus (step S402). Then, in a case that processing such as a configuration is necessary in accordance with the above-described received RRC signaling, the terminal apparatus performs processing (step S404). The terminal apparatus that has performed the processing may transmit RRC signaling for a response to the base station apparatus (not illustrated). Without being limited to the example described above, the RRC signaling may be used for other purposes.

Further, in MR-DC, RRC on the master node side may be used to transfer the RRC signaling for the configuration (cell group configuration, radio bearer configuration, measurement configuration, or the like) on the SCG side to the terminal apparatus. For example, in EN-DC or NGEN-DC, RRC signaling of E-UTRA transmitted and/or received to and/or from the eNB 102 and the UE 122 may include RRC signaling of NR in the form of a container. In addition, in NE-DC, RRC signaling of NR transmitted and/or received to and/or from the gNB 108 and the UE 122 may include RRC signaling of E-UTRA in the form of a container. The RRC signaling for the configuration on the SCG side may be transmitted and/or received to and/or from the master node and the secondary node.

Further, an embodiment is not limited to a case that MR-DC is used, and the RRC signaling for E-UTRA transmitted from the eNB 102 to the UE 122 may include the RRC signaling for NR, and the RRC signaling for NR transmitted from the gNB 108 to the UE 122 may include the RRC signaling for E-UTRA.

An example of parameters included in a message related to reconfiguration of an RRC connection will be described. FIG. 7 is an example of an ASN.1 notation representing a field and/or an information element related to a cell group configuration included in a message related to reconfiguration of an RRC connection in NR in FIG. 4. In addition, FIG.

8 is an example of an ASN.1 notation representing a field and/or an information element related to a cell group configuration included in a message related to reconfiguration of an RRC connection in E-UTRA in FIG. 4. Not only in FIG. 7 and FIG. 8 but also in examples of the ASN.1 according to the present embodiment, “omitted” and “partly omitted” are not a part of the notation of ASN.1 and indicate that other information is omitted. Further, there may also be omitted information elements in a part where neither “omitted” nor “partly omitted” is indicated. Further, in the present embodiment, the examples of the ASN.1 do not correctly comply with the ASN.1 notation method. In the present embodiment, the examples of ASN.1 are notations of examples of parameters of RRC signaling according to the present embodiment, and other names and other notations may be used. In addition, the examples of ASN.1 represent only examples related to main information closely associated with the present embodiment in order to avoid complicated description. Further, the parameters notated in ASN.1 may all be referred to as information elements without distinction between fields, information elements, or the like. In addition, in the present embodiment, fields, information elements, and the like notated in ASN.1 included in the RRC signaling may be rephrased as information, or may be rephrased as parameters. Further, the message related to reconfiguration of an RRC connection may be an RRC reconfiguration message in NR or an RRC connection reconfiguration message in E-UTRA.

The information element named CellGroupConfig in FIG. 7 may be an information element used for configuration, modification, release and the like of the cell group of the MCG or SCG in NR. The information element named CellGroupConfig may include a TCI information element to be described below. The information element named CellGroupConfig may be rephrased as a cell group configuration information element or a cell group configuration. In addition, in a case that the information element named CellGroupConfig is used for configuration of the cell group of the SCG in NR, the information element named CellGroupConfig may be rephrased as configuration on the SCG side. The information element named SpCellConfig included in the information element named CellGroupConfig may be an information element used for configuration of a special cell (SpCell). The information element named SpCellConfig may be rephrased as an SpCell configuration information element or SpCell configuration. The information element named DeactivatedSCG-Config-r17 included in the information element named SpCellConfig may be an information element configured in deactivation of the SCG to be described below. The information element named DeactivatedSCG-Config-r17 may be rephrased as configuration in deactivation of the SCG. Further, the information element named DeactivatedSCG-Config-r17 may include a parameter indicated by bfd-and-RLM for indicating to the terminal apparatus whether to perform BFD and/or RLM described below in the PSCell in the deactivated state of the SCG. The information element named TCI-Info included in the information element named SpCellConfig may be an information element indicating a TCI state. The information element named TCI-Info may be rephrased as a TCI information element.

A Transmission Configuration Indicator (TCI) state (TCI state) and a TCI information element will now be described. A TCI state may associate one or two downlink reference signals with a corresponding quasi-colocation (QCL) type. Furthermore, the TCI state may be configured in a PDSCH and/or a PDCCH. A TCI information element may be used to activate (and deactivate) the TCI state configured in the PDSCH and/or PDCCH of the PSCell. In addition, the TCI information element may also indicate a TCI state used to receive a PDCCH and/or an activated TCI state used to receive a PDSCH. In a case that a TCI information element is included in SpCell configuration, the terminal apparatus may consider the indicated TCI state as an activated TCI state for reception of the PDCCH and/or the PDSCH. In this case, in a case that bfd-and-RLM is included in the configuration for deactivation of an SCG and no reference signal is configured in the radio link monitoring configuration for BFD and/or an RLM to be described below, the terminal apparatus may use the indicated TCI state for reception of the PDCCH as a reference signal for BFD and/or RLM. In addition, the TCI information element may be included only in the configuration on the SCG side. In a case that the TCI information element is not included in the SpCell configuration, the terminal apparatus may use the previously activated TCI state. In a case that bfd-and-RLM is included in the configuration for deactivation of the SCG and no reference signal is configured in the radio link monitoring configuration for BFD and/or RLM to be described below, the terminal apparatus may use the TCI state previously activated for reception of the PDCCH as a reference signal for BFD and/or RLM.

Next, Radio Link Monitoring (RLM) will be described.

In a serving cell (for example, the PCell and/or the PSCell), the terminal apparatus may perform radio link monitoring by using a certain type of reference signal (a cell-specific reference signal (CRS)). In addition, the terminal apparatus may receive configuration (radio link monitoring configuration (RadioLinkMonitoringConfig)) indicating which reference signal is used for radio link monitoring in the serving cell (for example, the PCell and/or the PSCell) from the base station apparatus, and perform radio link monitoring by using one or multiple configured reference signals (here, referred to as an RLM-RS). In addition, the terminal apparatus may perform radio link monitoring by using another signal. A physical layer processing unit of the terminal apparatus may notify a higher layer of being in synchronization in a case that a condition of being in synchronization is satisfied in the serving cell (for example, the PCell and/or the PSCell).

The radio link monitoring configuration may include information indicating a purpose of monitoring and identifier information indicating a reference signal. For example, the purpose of monitoring may include a purpose of monitoring a radio link failure, a purpose of monitoring a failure of a beam, both of the above purposes, or the like. In addition, for example, the identifier information indicating a reference signal may include information indicating SSB-Index of an SSB of a cell. In other words, the reference signal may include a synchronization signal. In addition, for example, the identifier information indicating a reference signal may include information indicating an identifier associated with a channel state information reference signal (CSI-RS) configured for the terminal apparatus.

Next, beam failure detection (BFD) will be described.

For a MAC entity, a beam failure recovery procedure may be configured by RRC per serving cell. The beam failure recovery procedure may be used to notify a serving gNB (a base station apparatus in communication with the terminal apparatus) of a new SSB or a CSI-RS when beam failure is detected in one or multiple SSBs and/or CSI-RSs of a serving cell. Beam failure is detected by counting beam failure instance notifications received from a lower layer (PHY layer) to the MAC entity. In addition, the MAC entity may perform beam failure detection in the PSCell by using a certain type of reference signal (such as a cell-specific reference signal (CRS)) indicated in the radio link monitoring configuration in a case that the SCG is in a deactivated state. The MAC entity may perform some or all of the following (A), (B), and (C) in each serving cell for beam failure detection:

(A) start or restart a beam failure detection timer (beamFailureDetectionTimer) and increment a counter (BFI_COUNTER) by 1 in a case that a beam failure instance notification is received from a lower layer (PHY or the like); perform the following (A-1) in a case that the value of BFI_COUNTER is equal to or greater than a set threshold (beamFailureInstanceMaxCount);

(A-1) trigger beam failure recovery (BFR) for the serving cell in a case that the serving cell is an SCell, otherwise, perform (A-2) below;

(A-2) perform the following (A-3) in a case that the serving cell is the PSCell and the SCG is in the deactivated state, otherwise, initiate the random access procedure in the SpCell;

(A-3) indicate the beam failure in the PSCell to the higher layer (RRC entity or the like) in a case that the condition that a value of BFI_COUNTER is equal to or greater than beamFailureInstanceMaxCount is satisfied and the beam failure in the PSCell has not been transmitted to the higher layer (RRC entity or the like);

(B) configure BFI_COUNTER to be 0 in a case that beamFailureDetectionTimer for the serving cell expires or in a case that the configuration of beamFailureDetectionTimer, beamFailureInstanceMaxCount, and/or a beam failure detection reference signal (BFD-RS) is modified by a higher layer (the RRC entity, or the like);

(C) configure BFI_COUNTER to be 0 in a case that the serving cell is an SpCell and the random access procedure is successfully completed, and stop the beam failure recovery timer and consider that the beam failure recovery procedure has been successfully completed in a case that the beam failure recovery timer (beamFailureRecoveryTimer) is configured and running; otherwise, configure BFI_COUNTER to be 0, consider that the beam failure recovery procedure has been successfully completed, and cancel all beam failure recovery (BFR) operations triggered for this serving cell in a case that the serving cell is an SCell and the PDCCH is received that is addressed to C-RNTI indicating a new uplink grant for transmitting information for beam failure recovery of the SCell (e.g., information included in a BFR MAC CE of the SCell or a truncated BFR MAC CE of the SCell) or in a case that the SCell is in the deactivated state.

The MAC entity performs (A) described below in a case that at least one beam failure recovery (BFR) operation is triggered by the beam failure recovery procedure and is not cancelled.

(A) include the BFR MAC CE of the SCell and its subheader in a case that the UL-SCH resource can include the BFR MAC CE of the SCell and its subheader in consideration of the priority of the logical channel; otherwise, include the truncated BFR MAC CE of the SCell and its subheader in a case that the UL-SCH resource can include the truncated BFR MAC CE of the SCell and its subheader in consideration of the priority of the logical channel; otherwise, trigger a scheduling request for SCell beam failure recovery.

Here, beamFailureRecoveryTimer (beam failure recovery timer) will be described. In a case that the random access procedure is initiated for the BFR of the SpCell and the beam failure recovery configuration (beamFailureRecoveryConfig) is configured to Active UL BWP, the MAC entity may start beamFailureRecoveryTimer. In addition, in a case that beamFailureRecoveryTimer is running or not configured, the terminal apparatus may use Contention-Free Random Access (CFRA) for BFR. In addition, in a case that beamFailureRecovery Timer expires or is not running, the terminal apparatus may not use CFRA for BFR, but instead may use, for example, CBRA.

Next, an SCG Failure Information procedure will be described.

The SCG failure information procedure may be a procedure for notifying the E-UTRA or the master node of NR of SCG failure experienced by the terminal apparatus (SCG radio link failure, failure of reconfiguration with synchronization of the SCG, failure of an SCG configuration for RRC signaling on SRB3, failure in integrity verification of the SCG, etc.). In a case that neither transmission of the MCG nor transmission of the SCG is suspended and one of the following (A) to (E) is satisfied, the RRC entity of the terminal apparatus may initiate the SCG failure information procedure.

(A) Detection of radio link failure for the SCG (B) Detection of beam failure in the PSCell in the deactivated state of the SCG (C) Failure in reconfiguration with synchronization of the SCG (D) Failure in SCG configuration (E) Notification of failure in completeness verification from a lower layer (such as a PDCP entity) of the SCG related to SRB3

In a case that the SCG failure information procedure is initiated based on beam failure in the PSCell in the deactivated state of the SCG, the RRC entity of the terminal apparatus may perform some or all of the following (A), (B), and (C):

(A) stop a timer T304 for the SCG in a case that it is running;

(B) stop evaluation of conditional reconfiguration for Conditional PSCell Change (CPC) in a case that it is configured;

(C) initiate transmission of RRC signaling of the E-UTRA indicating the SCG failure information (SCGFailureInformationNR) in a case that the terminal apparatus is in (NG) EN-DC, otherwise, initiate transmission of RRC signaling of NR indicating the SCG failure information (SCGFailureInformation).

Activation and Deactivation of a cell will be described. The terminal apparatus communicating in Dual Connectivity configures a master cell group (MCG) and a secondary cell group (SCG) by using the message related to reconfiguration of an RRC connection. Each cell group may include a special cell (SpCell) and zero or more cells (secondary cells (SCells)) other than the special cell. An SpCell of the MCG is also referred to as a PCell. An SpCell of the SCG is also referred to as a PSCell. Deactivation of a cell may not be applied to an SpCell but may be applied to an SCell.

In addition, deactivation of a cell may not be applied to a PCell but may be applied to a PSCell. In this case, deactivation of a cell may be processing different between the SpCell and the SCell.

Activation and deactivation of a cell may be processed in a MAC entity that is present for each cell group. The SCell configured for the terminal apparatus may be activated and/or deactivated due to some or all of the following (A) to (C).

(A) Reception of a MAC CE for causing activation/deactivation of the SCell
(B) SCell deactivation timer configured for each SCell not configured with the PUCCH.
(C) RRC parameter (sCellState) configured for each SCell configured for the terminal apparatus Specifically, the MAC entity of the terminal apparatus may perform the following processing (AD) for each SCell configured for the cell group.

Processing AD

In a case that an RRC parameter (sCellState) configured for the SCell in configuring SCell is configured to be "activated" or the MAC CE for activating the SCell has been received, the MAC entity of the UE 122 performs processing (AD-1). Otherwise, in a case that the MAC CE for deactivating the SCell has been received, or the SCell deactivation timer expires in the SCell in the activated state, the MAC entity of the UE 122 performs processing (AD-2). In a case that an uplink grant or downlink assignment is received on the PDCCH of the SCell in the activated state, or in a case that an uplink grant or downlink assignment for the SCell in the activated state is received on the PDCCH of a certain serving cell, or in a case that the MAC PDU is transmitted in a configured uplink grant, or in a case that the MAC PDU is received in configured downlink assignment, the MAC entity of the UE 122 restarts a SCell deactivation timer associated with the SCell. In a case that the SCell enters a deactivated state, the MAC entity of the UE 122 performs processing (AD-3).

Processing AD-1

In a case that, in NR, the SCell is in the deactivated state before the MAC CE for activating the SCell is received or the RRC parameter (sCellState) configured for the SCell in configuring SCell is configured to be activated, the MAC entity of the UE 122 performs processing (AD-1A) or processing (AD-1B).

In addition, the MAC entity of the UE 122 starts the SCell deactivation timer associated with the SCell, or restarts the timer (in a case that the timer has already started).

In a case that an Active DL BWP is not a Dormant BWP to be described below, the MAC entity of the UE 122 performs some or all of the following (A) and (B):

(A) (re)initialize all suspended configured uplink grants of grant type 1 associated with the SCell in accordance with the stored configuration, if any;
(B) trigger a PHR.

In a case that the MAC CE for activating the SCell is received, and the BWP indicated by a first active downlink BWP identifier (firstActiveDownlinkBWP-Id) configured for the SCell by using the RRC signaling is not configured as a Dormant BWP, the MAC entity of the UE 122 performs processing (AD-1A). In a case that the MAC CE for activating the SCell is received, and the BWP indicated by the first active downlink BWP identifier (firstActiveDownlinkBWP-Id) configured for the SCell by using the RRC signaling is configured as a Dormant BWP, the MAC entity of the UE 122 performs processing (AD-1B). In addition, the MAC entity of the UE 122 performs some or all of the following (A) and (B):

(A) activate a BWP indicated by the first active downlink BWP identifier (firstActiveDownlinkBWP-Id) configured in the RRC signaling;
(B) activate a BWP indicated by the first active uplink BWP identifier (firstActiveUplinkBWP-Id) configured in the RRC signaling.

Processing AD-1A

The MAC entity of the UE 122 activates an SCell and performs some or all of the following (A) to (E):

(A) transmit a sounding reference signal (SRS) in the SCell;
(B) report the CSI for the SCell;
(C) monitor the PDCCH in the SCell;
(D) monitor the PDCCH for the SCell; (in a case that scheduling for the SCell is performed in another serving cell)
(E) perform PUCCH transmission in the SCell in a case that the PUCCH is configured.

Processing AD-1B

The MAC entity of the UE 122 stops a BWP deactivation timer of the serving cell in a case that the BWP deactivation timer is running.

Processing AD-2

The MAC entity of the UE 122 performs some or all of the following (A) to (F):

(A) deactivate the SCell;
(B) stop the SCell deactivation timer associated with the SCell;
(C) deactivate all of the Active BWPs associated with the SCell;
(D) clear all configured downlink assignments and/or all configured uplink grants of grant type 2 associated with the SCell;
(E) suspend all configured uplink grants of grant type 1 associated with the SCell;
(F) flush a HARQ buffer associated with the SCell.

Processing AD-3

The MAC entity of the UE 122 performs some or all of the following (A) to (D):

(A) not transmit SRS in the SCell;
(B) not report CSI for the SCell;
(C) not transmit PUCCH, UL-SCH, and/or RACH in the SCell;
(D) not monitor PDCCH for the SCell and/or PDCCH for the SCell.

As described above, activation and deactivation of the SCell is performed by the MAC entity performing the processing (AD).

In addition, in a case that the SCell is added as described above, an initial state of the SCell may be configured by RRC signaling.

Here, the SCell deactivation timer will be described. The SCell which is not configured with the PUCCH may be notified of a value of the SCell deactivation timer (information related to time at which the timer is considered to have expired) by the RRC signaling. For example, in a case that information indicating 40 ms is received as a value of the SCell deactivation timer through RRC signaling, in the processing (AD), the timer is considered to have expired after the elapse of time (here, 40 ms) reported without stopping of the timer since the timer is started or restarted. In addition, the SCell deactivation timer may be a timer named sCellDeactivation Timer.

Next, Deactivation and Activation of the SCG will be described.

Deactivation of the SCG may mean deactivating the SCG. In addition, deactivation of the SCG may mean that the MAC entity is associated with the SCG and deactivates a cell group corresponding to the MAC entity. In addition, deactivation of the SCG may mean deactivating a PSCell (SpCell of the SCG) or deactivating a PSCell. Activation of the SCG may mean activating the SCG. In addition, activation of the SCG may mean that the MAC entity is associated with the SCG and activates a cell group corresponding to the MAC entity. In addition, activation of the SCG may mean activating a PSCell (SpCell of the SCG) or activating a PSCell.

In LTE and/or NR, the deactivated state of the SCG may be a state in which the terminal apparatus performs some or all of the following (A) to (P) in the PSCell (SpCell) of the SCG. In addition, the deactivated state of the SCG may mean a state in which the SCG is deactivated (a state in which the SCG is dormant).

(SD-1):

(A) not transmit SRS in the PSCell;
(B) not measure CSI for the PSCell;
(C) not report CSI for the PSCell;
(D) not transmit PUCCH in the PSCell;
(E) not transmit UL-SCH in the PSCell;
(F) not trigger random access in the PSCell;
(G) not monitor PDCCH in the PSCell;
(H) not monitor PDCCH for the PSCell;
(I) deactivate Active BWPs in the PSCell;
(J) perform discontinuous reception (DRX) in the PSCell;
(K) not monitor PDCCH of the PSCell and/or the PDCCH for the PSCell addressed to the C-RNTI, the MCS-C-RNTI, and/or the CS-RNTI indicating an uplink grant for UL-SCH transmission in the PSCell;
(L) not monitor PDCCH of the PSCell and/or no PDCCH for the PSCell addressed to the C-RNTI, the MCS-C-RNTI, and/or the CS-RNTI indicating an uplink grant in the above-described BWP, with the BWP being activated in the PSCell;
(M) perform Automatic Gain Control (AGC), Beam Failure Detection (BFD) including beam failure recovery, and/or Radio Link Monitoring (RLM) in the PSCell;
(N) suspend a part or all of the configured uplink grants of grant type 1 associated with the PSCell;
(O) maintain the timeAlignmentTimer (TAT) associated with the TAG (PTAG) containing the PSCell;
(P) reset the MAC entity on the SCG side.

(M) in (SD-1) described above may be implemented based on a parameter called bfd-and-RLM included in the configuration on the SCG side.

(P) of the above-described (SD-1) may include some or all of (A) to (O) of the above-described (SD-1). In addition, (P) of the above-described (SD-1) may include some or all of (P-1) to (P-15) described below: Further, in (P-1) below, the value of a parameter Bj may remain 0 in the deactivated state of the SCG.

(P-1) initialize the parameter Bj configured for each logical channel related to the SCG to 0;
(P-2) stop all timers in a case that they are running except for the beam failure detection timer (beamFailureDetectionTimer) and timeAlignmentTimer (TAT) associated with the PSCell in a case that beam failure detection (BFD) is configured in the deactivated state of the SCG;
(P-3) set the values of New Data Indicators (NDI) of all uplink HARQ processes to 0;
(P-4) stop the random access procedure being performed, if any;
(P-5) discard the explicitly signaled four-step and two-step RA-type Contention-Free Random Access (CFRA) resources, if any;
(P-6) flush the buffer of Msg3;
(P-7) flush the buffer of MSGA;
(P-8) cancel the triggered SR procedure, if any;
(P-9) cancel the triggered BSR procedure, if any;
(P-10) cancel the triggered PHR procedure, if any;
(P-11) cancel confirmation of the triggered configured uplink grant, if any;
(P-12) flush all soft buffers of the downlink HARQ process;
(P-13) in each downlink HARQ process, consider the next received transmission for a certain transport block (TB) to be the very first transmission;
(P-14) release a Temporary C-RNTI, if any;
(P-15) reset the counter (BFI_COUNTER) associated with the PSCell in a case that beam failure detection (BFD) is not configured with the parameter (bfd-and-RLM) in the SCG.

In LTE and/or NR, the activated state of the SCG may be a state in which the terminal apparatus performs some or all of the following (A) to (P) in the PSCell (SpCell) of the SCG. In addition, the activated state of the SCG may mean a state in which the SCG is activated (a state in which the SCG is not dormant).

(SA-1):

(A) transmit an SRS in the PSCell;
(B) measure a CSI for the PSCell;
(C) report the CSI for the PSCell;
(D) transmit the PUCCH in the PSCell;
(E) transmit the UL-SCH in the PSCell;
(F) perform random access in the PSCell in a case that it is triggered;
(G) monitor the PDCCH in the PSCell;
(H) monitor the PDCCH for the PSCell;
(I) activate an inactive BWP in the PSCell;
(J) perform discontinuous reception (DRX) in the PSCell;
(K) monitor the PDCCH of the PSCell and/or the PDCCH for the PSCell addressed to the C-RNTI, the MCS-C-RNTI, and/or the CS-RNTI indicating an uplink grant for UL-SCH transmission in the PSCell;
(L) monitor the PDCCH of the PSCell and/or the PDCCH for the PSCell addressed to the C-RNTI, the MCS-C-RNTI, and/or the CS-RNTI indicating an uplink grant in the above-described BWP, with the BWP being activated in the PSCell;
(M) perform Automatic Gain Control (AGC), Beam Failure Detection (BFD) including beam failure recovery, and/or Radio Link Monitoring (RLM) in the PSCell;
(N) (re)initialize some or all suspended configured uplink grants of grant type 1 associated with the PSCell in accordance with the stored configuration, if any;
(O) maintain the timeAlignmentTimer (TAT) associated with the TAG (PTAG) containing the PSCell.
(P) initialize the parameter Bj configured for each logical channel related to the SCG to 0.

In LTE and/or NR, the terminal apparatus may determine that the SCG enters the deactivated state based on some or all of the following (A) to (H). Further, the signaling and control elements in the following (A) to (F) may be transmitted from the base station apparatus to the terminal apparatus via the SCG. Additionally or alternatively, the signaling and control elements in the following (A) to (F) may be transmitted from the base station apparatus to the terminal apparatus via a cell group other than the SCG (an MCG, an SCG other than the corresponding SCG, and the like).

(SD-2)

(A) Reception of RRC signaling indicating deactivation of the SCG (B) Reception of a MAC CE indicating deactivation of the SCG
(C) Reception of RRC signaling indicating deactivation of the PSCell
(D) Reception of a MAC CE indicating deactivation of the PSCell
(E) Reception of other RRC signaling
(F) Reception of another MAC CE
(G) Expiry of a deactivation timer of the SCG
(H) Expiry of a deactivation timer of the PSCell.

The RRC signaling of (A), (C), and (E) of (SD-2) above may include, for example, a parameter called scg-State. In a case that scg-State is included in the RRC signaling, deactivation of the SCG is indicated, and in a case that scg-State is not included in the RRC signaling, activation of the SCG is indicated. In addition, scg-State may be included in an RRC reconfiguration message or an RRC resumption message. In addition, the RRC signaling may be generated at the MN.

Figure 11:
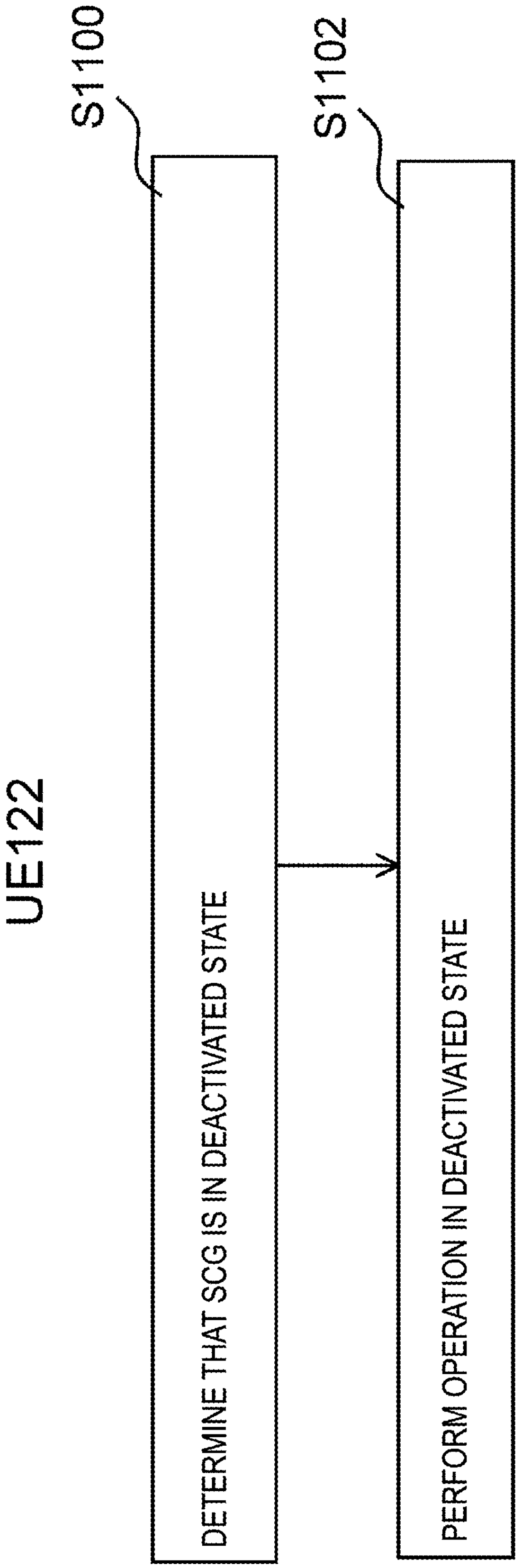
FIG. 11 is an example of processing related to deactivation of an SCG according to the present embodiment.

FIG. 11 is a diagram illustrating an example of an embodiment. In FIG. 11, a processing unit 502 of the UE 122 determines that the SCG enters the deactivated state based on the above-described (SD-2) (step S1100). In addition, the processing unit 502 of the UE 122 deactivates the SCG based on the above determination and performs an operation as indicated in the above-described (SD-1) in the deactivated state of the SCG (step S1102).

In LTE and/or NR, the terminal apparatus may determine that the SCG enters the activated state based on some or all of the following (A) to (K). Further, the signaling and control elements in the following (A) to (F) may be transmitted from the base station apparatus to the terminal apparatus via the SCG. Additionally or alternatively, the signaling and control elements in the following (A) to (F) may be transmitted from the base station apparatus to the terminal apparatus via a cell group other than the SCG (an MCG, an SCG other than the corresponding SCG, and the like). That the SCG is in an activated state may be that the SCG is not in a deactivated state.

(SA-2)
(A) Reception of RRC signaling indicating activation of the SCG
(B) Reception of a MAC CE indicating activation of the SCG
(C) Reception of RRC signaling indicating activation of the PSCell
(D) Reception of a MAC CE indicating activation of the PSCell
(E) Reception of other RRC signaling
(F) Reception of another MAC CE
(G) Deactivation timer of the SCG
(H) Deactivation timer of the PSCell
(I) Initiation of a random access procedure due to a scheduling request triggered for transmitting a MAC PDU including a MAC SDU
(J) Initiation of a random access procedure
(K) Initiation of a random access procedure due to a scheduling request (in other words, initiated by the MAC entity itself).

In the RRC signaling of (A), (C), and (E) of (SA-2) described above, for example, the parameter called scg-State may not be included in the RRC reconfiguration message and/or the RRC resumption message. In addition, the RRC signaling may be generated at the MN.

Figure 10:
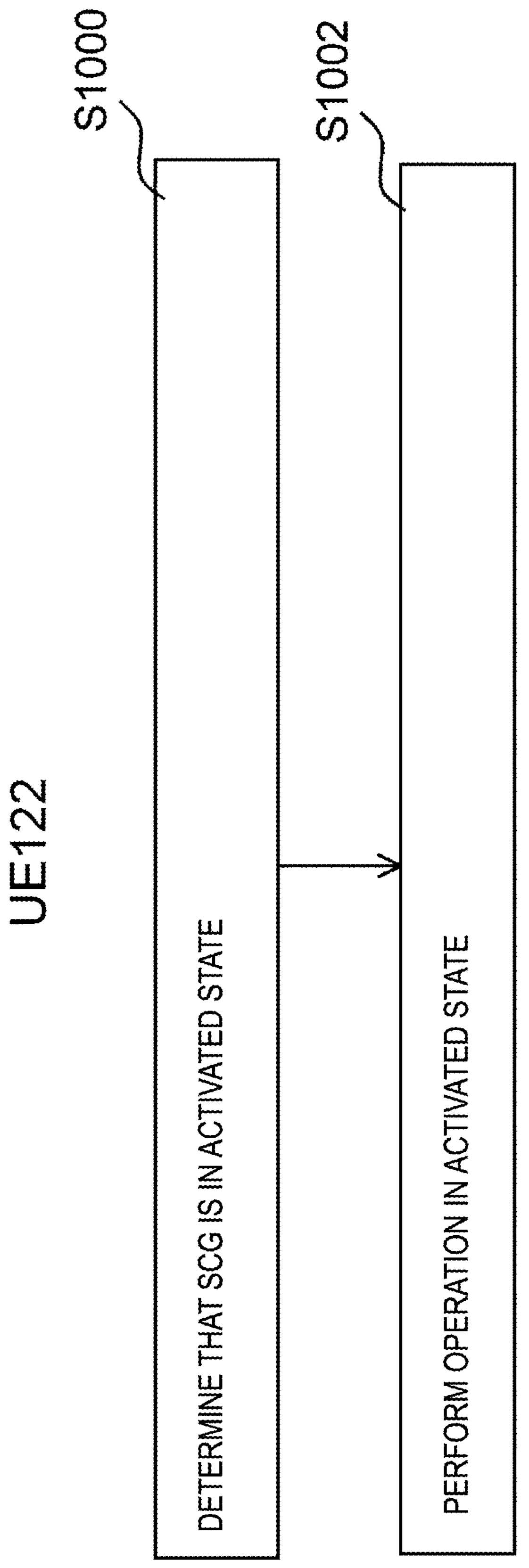
FIG. 10 is an example of processing related to activation of an SCG according to the present embodiment.

FIG. 10 is a diagram illustrating an example of an embodiment. In FIG. 10, the processing unit 502 of the UE 122 determines that the SCG enters the deactivated state based on the above-described (SA-2) (step S1000). In addition, the processing unit 502 of the UE 122 activates the SCG based on the above determination and performs an operation as indicated in the above-described (SA-1) in the activated state of the SCG (step S1002).

The terminal apparatus that performs the deactivation of the SCG may perform some or all of following (A) to (I) for the SCG:

(SD-3)
(A) consider that the SCG is deactivated;
(B) indicate deactivation of the SCG to a lower layer (such as a MAC entity);
(C) in a case that the terminal apparatus is in the RRC_CONNECTED state and the SCG has been activated before signaling indicating deactivation of the SCG is received, in a case that SRB3 is configured before an RRC reconfiguration message or an RRC connection reconfiguration message is received and the SRB3 is not released according to any RRC signaling (RadioBearerConfig) for radio bearer configuration included in the RRC reconfiguration message or the RRC connection reconfiguration message, trigger the PDCP entity of the SRB3 to perform SDU discard, and additionally or alternatively, re-establish the RLC entity of the SRB3;
(D) deactivate all SCells;
(E) consider that all SCell deactivation timers associated with the SCells in the activated state have expired;
(F) consider that all of the SCell deactivation timers associated with the SCells in the dormant state have expired;
(G) start or restart none of the SCell deactivation timers associated with all of the SCells;
(H) ignore the MAC CE for activating the SCells; For example, in the processing (AD), processing (AD-1) is performed in a case that the MAC CE for activating the SCell is received and the deactivation of the SCG is not indicated (or the SCG is not in the deactivated state).
(I) perform the processing (AD-2). For example, in the processing (AD), perform the processing (AD-2) in a case that the deactivation of the SCG is indicated (or the SCG is in the deactivated state).

In a case that a higher layer (the RRC entity or the like) indicates deactivation of the SCG to the MAC entity based on (B) of (SD-3) described above, the MAC entity of the terminal apparatus may deactivate all SCells of the SCG and additionally or alternatively deactivate the PSCell based on (SD-1) described above.

The terminal apparatus that performs the activation of the SCG may perform some or all of the following (A) to (D) for the SCG:

(SA-3)
(A) consider that the SCG is activated;
(B) in a case that the SCG in the deactivated state is configured before the terminal apparatus receives signaling indicating activation of the SCG, indicate to the lower layer (the MAC entity or the like) to activate the SCG;
(C) perform processing (AD-1) to activate all of the SCells;
(D) in a case that the activation of the SCG is performed based on RRC signaling, in a case that a parameter related to random access to the PSCell (SpCell) is included in the RRC signaling, initiate the random access procedure in the PSCell based on the parameter received.

In a case that the higher layer (the RRC entity or the like) indicates activation of the SCG to the MAC entity based on (B) of (SA-3) described above, the MAC entity of the terminal apparatus may activate the SCG based on (SA-1) described above.

In a case that the terminal apparatus determines that the SCG is in the activated state based on (SA-2) described above, the RRC entity of the terminal apparatus may indicate starting of the random access procedure in the PSCell of the SCG to the lower layer (the MAC entity or the like) when it is determined that the following (A) or (B) is satisfied.

(A) EN-DC or NGEN-DC is configured for the terminal apparatus, an RRC reconfiguration message is received via SRB1 of E-UTRA or an RRC connection reconfiguration message of E-UTRA (handover from NR standalone to (NG) EN-DC), a parameter named scg-State is not included in the RRC connection reconfiguration message of E-UTRA including the RRC reconfiguration message for configuration on the SCG side in the form of a container, and (A-1) or (A-2) below is satisfied.

(A-1) Reconfiguration with synchronization is included in SpCell configuration of the SCG.

(A-2) The SCG is deactivated before the RRC signaling of E-UTRA including the RRC reconfiguration message for the configuration on the SCG side in the form of a container described in (A) is received, and the lower layer (the MAC entity, or the like) considers that the random access procedure is needed for activation of the SCG.

(B) NR-DC is configured for the terminal apparatus, the RRC reconfiguration message is received via SRB1 of the SCG, the parameter named scg-State is not included in the RRC reconfiguration message of NR including the RRC reconfiguration message for the configuration on the SCG side in the form of a container or an RRC resumption message, and the following (B-1) or (B-2) is satisfied.

(B-1) Reconfiguration with synchronization is included in SpCell configuration of the SCG.

(B-2) The SCG is deactivated before the RRC signaling of NR including the RRC reconfiguration message for the configuration on the SCG side in the form of a container described in (B) is received, and the lower layer (the MAC entity, or the like) considers that the random access procedure is needed for activation of the SCG.

Whether BFD is configured to be performed in the PSCell in the deactivated state of the SCG may be configured with the parameter named bfd-and-RLM of FIG. 7. In other words, the above-mentioned configuration to perform BFD in the PSCell in the deactivated state of the SCG may mean that the parameter indicates performing BFD in the PSCell in the deactivated state of the SCG, or the parameter is included in the configuration on the SCG side. In addition, the above-mentioned configuration not to perform BFD in the PSCell in the deactivated state of the SCG may mean that the parameter indicates not performing BFD in the PSCell in the deactivated state of the SCG, or that the parameter is not included in the configuration on the SCG side.

Figure 9:
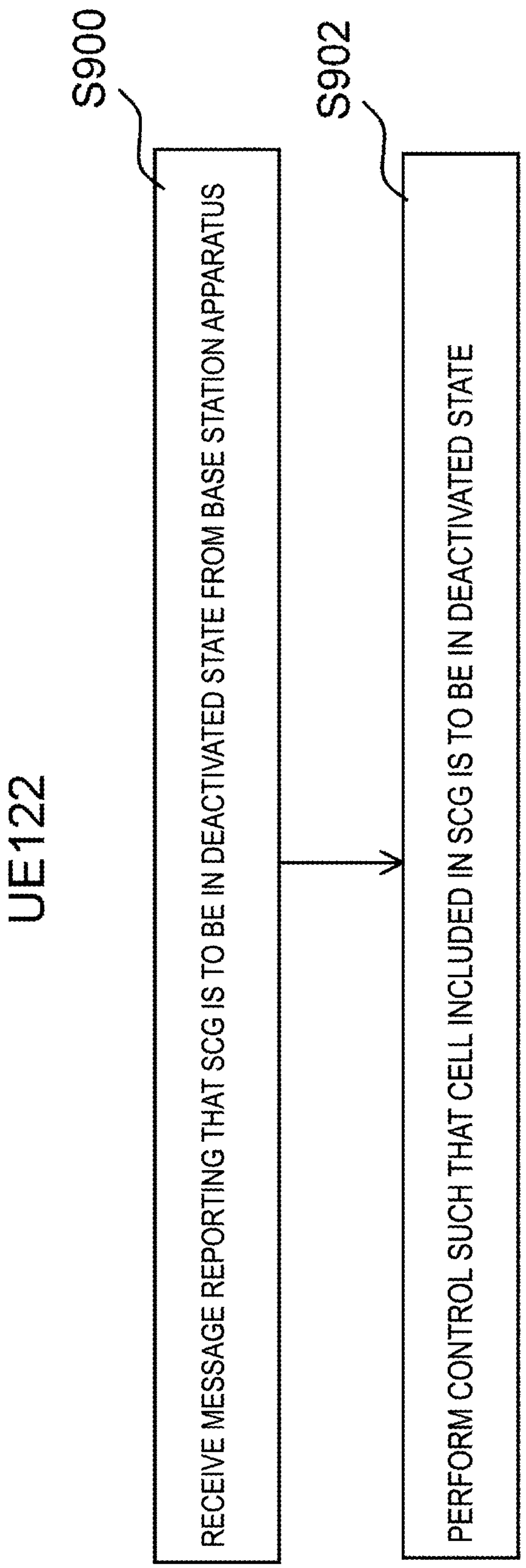
FIG. 9 is an example of processing related to deactivation of an SCG according to the present embodiment.

FIG. 9 is a diagram illustrating an example of an embodiment. In FIG. 9, the UE 122 receives signaling (RRC signaling, MAC CE, or the like) indicating deactivation of the SCG from the eNB 102 or the gNB 108 (step S900). The UE 122 performs control such that some or all of cells of the SCG are in the deactivated state based on the notification (step S902).

With the above-described operation, in the processing of deactivating the SCG, efficient state change can be performed with no need for a transmitter 504 of the UE 122 to independently transmit the MAC CE for changing the state of the cells of the SCG to the deactivated state. In addition, in a case that the deactivation of the SCG is performed based on the RRC signaling, configuration of the initial state is performed in the RRC layer and the state change is performed in the MAC layer in the past, however, with the above-described operation, the state change of the SCG can be efficiently performed while a mismatch between an indication from the RRC layer and an indication from the MAC layer is avoided.

Based on the above description, various embodiments will be described. Further, each processing operation described above may be applied to each processing operation to be omitted in the following description.

Figure 5:
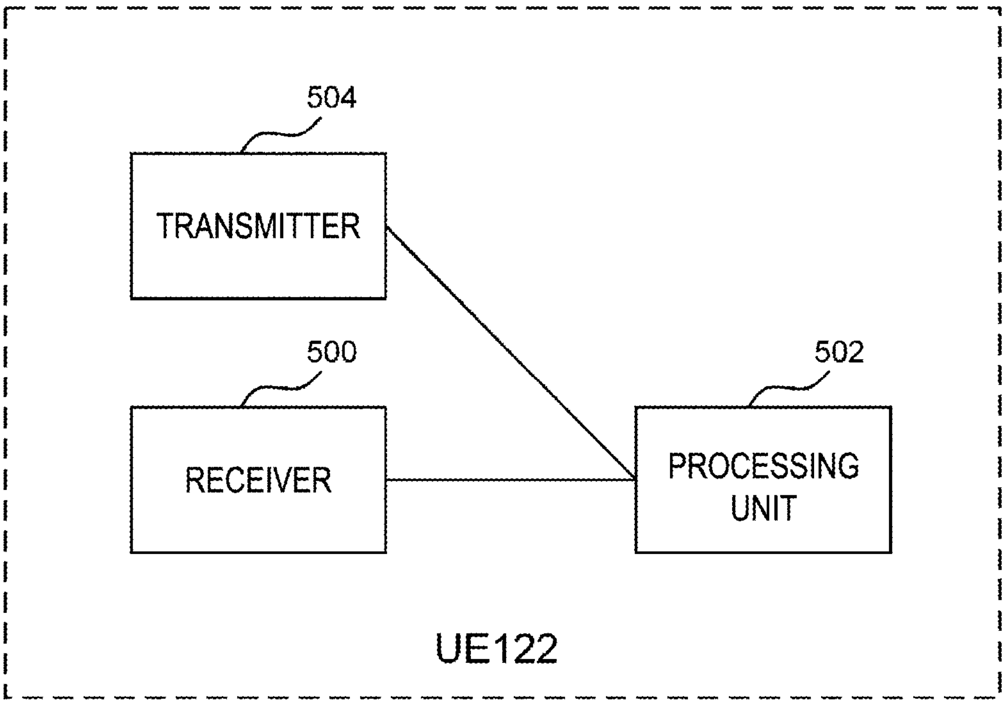
FIG. 5 is a block diagram illustrating a configuration of a terminal apparatus according to the present embodiment.

FIG. 5 is a block diagram illustrating a configuration of the terminal apparatus (UE 122) according to the present embodiment. Further, FIG. 5 illustrates only the main constituent elements closely related to the present embodiment in order to avoid complication of description.

The UE 122 illustrated in FIG. 5 includes a receiver 500 that receives control information (DCI, RRC signaling, or the like) from the base station apparatus, the processing unit 502 that performs processing in accordance with parameters) included in the received control information, and the transmitter 504 that transmits control information (UCI, RRC signaling, or the like) to the base station apparatus. The above-described base station apparatus may be the eNB 102, or may be the gNB 108. In addition, the processing unit 502 may include some or all of functions of various layers (for example, the physical layer, the MAC layer, the RLC layer, the PDCP layer, the SDAP layer, the RRC layer, and the NAS layer). In other words, the processing unit 502 may include some or all of a physical layer processing unit, a MAC layer processing unit, an RLC layer processing unit, a PDCP layer processing unit, a SDAP processing unit, an RRC layer processing unit, and a NAS layer processing unit.

Figure 6:
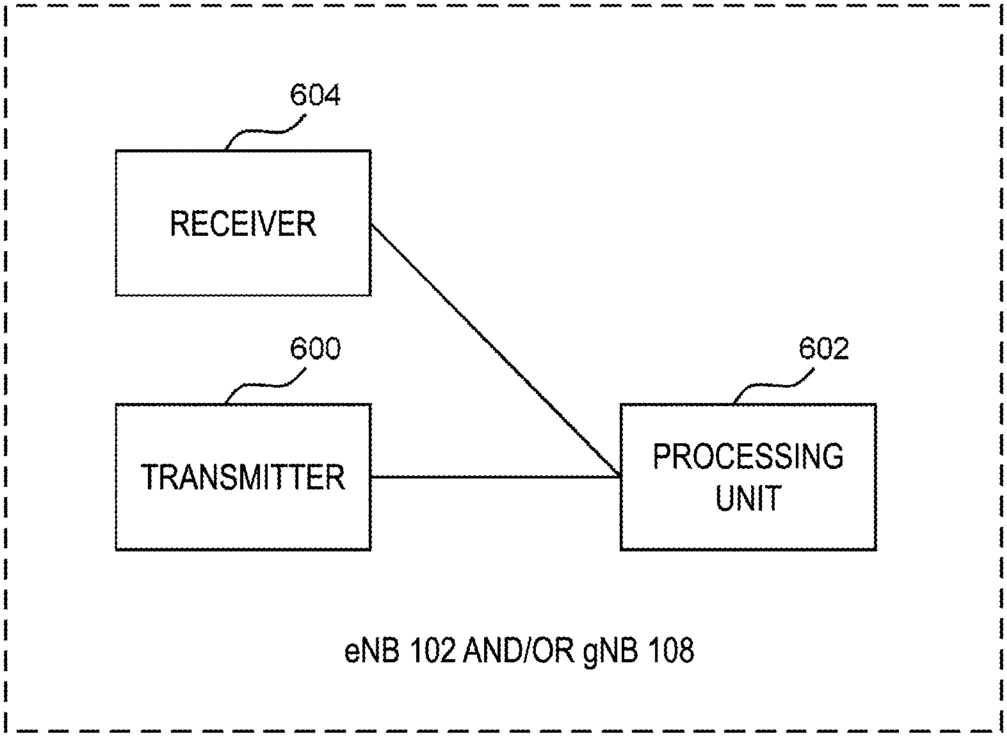
FIG. 6 is a block diagram illustrating a configuration of a base station apparatus according to the present embodiment.

FIG. 6 is a block diagram illustrating a configuration of the base station apparatus according to the present embodiment. Further, FIG. 6 illustrates only the main constituent elements closely related to the present embodiment in order to avoid complication of description. The above-described base station apparatus may be the eNB 102, or may be the gNB 108.

The base station apparatus illustrated in FIG. 6 includes a transmitter 600 that transmits control information (DCI, RRC signaling, or the like) to the UE 122, a processing unit 602 that creates control information (DCI, RRC signaling including parameters, or the like) and transmits the control information to the UE 122 to thereby cause the processing unit 502 of the UE 122 to perform processing, and a receiver 604 that receives control information (UCI, RRC signaling, or the like) from the UE 122. In addition, the processing unit 602 may include some or all of functions of various layers (for example, the physical layer, the MAC layer, the RLC layer, the PDCP layer, the SDAP layer, the RRC layer, and the NAS layer). In other words, the processing unit 602 may include some or all of a physical layer processing unit, a MAC layer processing unit, an RLC layer processing unit, a PDCP layer processing unit, a SDAP processing unit, an RRC layer processing unit, and a NAS layer processing unit.

With reference to FIG. 10, an example of processing of the terminal apparatus according to the present embodiment will be described.

FIG. 10 is a diagram illustrating an example of processing of the terminal apparatus according to the present embodiment. The processing unit 502 of the UE 122 may determine that the SCG is in the activated state based on the above-described (SA-2) (step S1000). In addition, the processing unit 502 of the UE 122 may perform operations in the activated state based on the determination (step S1002).

An example of an operation of the UE 122 in the above-described activated state will be described. In the activated state, the UE 122 may perform some or all of the processing described in the above (SA-1) in the PSCell and/or each of one or more SCells of a certain cell group.

The activated state may be a state in which the SCG is activated. In addition, the above-described activated state may be a state in which the SCG has resumed from the dormant state. In addition, the above-described activated state may be a state in which the above-described SCG is not in the dormant state. In addition, the above-described activated state may be a state transitioned from the deactivated state in a case that the random access procedure caused by a scheduling request triggered for transmitting a MAC PDU including a MAC SDU is initiated. In addition, the above-described activated state may be a state transitioned from the deactivated state in a case that resumption from the dormant state is indicated from the RRC entity.

In step S1000, the processing unit 502 of the UE 122 may determine that the SCG has transitioned from the deactivated state to the activated state as indicated in (SA-2) described above.

When the UE 122 receives information for activating the SCG, the UE 122 may cause the SCG to transition from the deactivated state to the activated state (i.e., may activate the SCG). In addition, when the UE 122 receives information for indicating resumption (Resume) from the dormant state of the SCG, the UE 122 may cause the SCG to transition from the deactivated state to the activated state. In addition, when the UE 122 receives information for indicating resumption from the dormant state of the PSCell, the UE 122 may cause the SCG to transition from the deactivated state to the activated state. In addition, when the UE 122 receives other information, the UE 122 may cause the SCG to transition from the deactivated state to the activated state. In addition, the UE 122 may cause the SCG to transition from the deactivated state to the activated state based on the timer related to dormancy of the SCG. In addition, the UE 122 may cause the SCG to transition from the deactivated state to the activated state based on the timer related to dormancy of the PSCell. In addition, in a case that the UE 122 initiates the random access procedure caused by a scheduling request triggered for transmitting a MAC PDU including a MAC SDU, the UE 122 may cause the SCG to transition from the deactivated state to the activated state. In addition, in a case that the UE 122 initiates the random access procedure, the UE 122 may cause the SCG to transition from the deactivated state to the activated state. In addition, in a case that the UE 122 initiates the random access procedure caused by a scheduling request (i.e., initiated by the MAC entity itself), the UE 122 may cause the SCG to transition from the deactivated state to the activated state. In addition, the MAC entity of the UE 122 may acquire an indication for activating the SCG, an indication of resumption from the dormant SCG, an indication of resumption from the dormant state of the PSCell, and/or other information from the RRC entity of the UE 122. In addition, after the MAC entity acquires the information from the RRC entity, the UE 122 may determine that the SCG is in the activated state and cause the SCG to transition from the deactivated state to the activated state as indicated in the above-described (SA-2). In a case of causing the SCG to transition from the deactivated state to the activated state, the UE 122 may perform the processing indicated in the above-described (SA-3).

An example of processing of the terminal apparatus according to the present embodiment will be described with reference to FIG. 11.

FIG. 11 is a diagram illustrating an example of processing of the terminal apparatus according to the present embodiment. The processing unit 502 of the UE 122 may determine that the SCG is in the deactivated state based on the above-described (SD-2) (step S1100). In addition, the processing unit 502 of the UE 122 may perform an operation in the deactivated state based on the determination (step S1102).

An example of an operation of the UE 122 in the above-described deactivated state will be described. In the deactivated state, the UE 122 may perform a part or all of the processing described in the above (SD-1) in the PSCell and/or each of one or more SCells of a certain cell group.

The deactivated state may be a state in which the SCG is deactivated. In addition, the above-described deactivated state may be entering to a dormant SCG. In addition, the above-described deactivated state may be the above-described dormant state of the SCG. In addition, the deactivated state may be a state in which the Active BWP of the PSCell and/or one or more SCells of the SCG is a dormant BWP. In addition, the above-described deactivated state may be a state of transition from the activated state in a case that the RRC entity indicates entering to the dormant state.

In step S1100, the processing unit 502 in UE 122 may determine that the SCG has transitioned from the activated state to the deactivated state as indicated in the above-described (SD-2).

When the UE 122 receives information indicating deactivation of the SCG, the UE 122 may cause the SCG to transition from the activated state to the deactivated state. In addition, when the UE 122 receives information indicating entering to the dormant SCG, the UE 122 may cause the SCG to transition from the activated state to the deactivated state. In addition, when the UE 122 receives information indicating dormancy of the PSCell, the UE 122 may cause the SCG to transition from the activated state to the deactivated state. In addition, when the UE 122 receives other information, the UE 122 may cause the SCG from the activated state to the deactivated state. In addition, in a case that the timer related to the dormancy of the SCG expires, the UE 122 may cause the SCG to transition from the activated state to the deactivated state. In addition, in a case that the timer related to the dormancy of the PSCell expires, the UE 122 may cause the SCG to transition from the activated state to the deactivated state. In addition, the MAC entity of the UE 122 may acquire an indication for deactivating the SCG, an indication of entering to the dormant SCG, an indication of the dormancy of the PSCell, and/or other information from the RRC entity of the UE 122. In addition, after the MAC entity acquires the information from the RRC entity, the UE 122 may determine that the SCG is in the deactivated state and cause the SCG to transition from the activated state to the deactivated state as indicated in the above-described (SD-2). In a case of causing the SCG to transition from the activated state to the deactivated state, the UE 122 may perform the processing indicated in the above-described (SD-3).

An example of processing of the terminal apparatus according to the present embodiment will be described with reference to FIG. 12.

Figure 12:
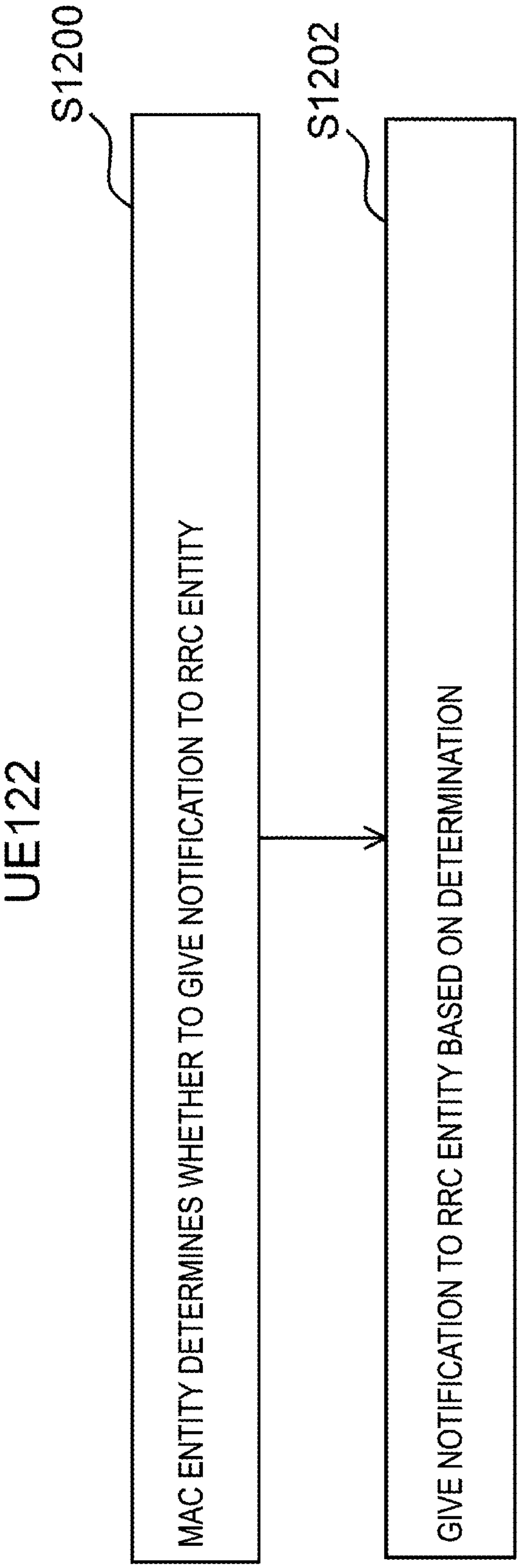
FIG. 12 is an example of processing related to an MAC entity of the terminal apparatus according to the present embodiment.

FIG. 12 is a diagram illustrating an example of processing of the terminal apparatus according to the present embodiment. A MAC entity 302 of the UE 122 determines whether to provide a notification to an RRC entity 308 of the UE 122 (step S1200), and provides a notification to the RRC entity 308 based on the determination (step S1202). The MAC entity 302 and the RRC entity 308 may be replaced with the MAC entity 202 and the RRC entity 208, respectively.

An example of the determination in step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that the condition of the value of BFI_COUNTER described above being equal to or greater than beamFailureInstanceMaxCount described above is satisfied and the fact that the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time the condition of the value of BFI_COUNTER described above being equal to or greater than beamFailureInstanceMaxCount described above was satisfied, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the SCG was deactivated and the condition of the value of BFI_COUNTER described above being equal to or greater than beamFailureInstanceMaxCount described above was satisfied, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that BFI_COUNTER described above is configured to be 0 and the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time BFI_COUNTER described above was configured to be 0, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the SCG was deactivated and BFI_COUNTER described above was configured to be 0, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that beamFailureDetectionTimer of the PSCell expired and the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time beamFailureDetectionTimer of the PSCell expired, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time the SCG was deactivated and beamFailureDetectionTimer of the PSCell expired, the RRC entity 308 of the UE 122 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that configurations of beamFailureDetectionTimer, beamFailureInstanceMaxCount, and/or a BFD-RS of the PSCell have been changed by the RRC entity 308 of the UE 122, or the like and the RRC entity 308 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time configurations of beamFailureDetectionTimer, beamFailureInstanceMaxCount, and/or a BFD-RS of the PSCell have been changed by the RRC entity 308 of the UE 122, or the like, the RRC entity 308 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time the SCG was deactivated and configurations of beamFailureDetectionTimer, beamFailureInstanceMaxCount, and/or a BFD-RS of the PSCell were changed by the RRC entity 308 of the UE 122, or the like, the RRC entity 308 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that a notification of a change in configurations of beamFailureDetectionTimer, beamFailureInstanceMaxCount, and/or a BFD-RS of the PSCell was received by the RRC entity 308 of the UE 122, and the RRC entity 308 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time a notification of a change in configurations of beamFailureDetectionTimer, beamFailureInstanceMaxCount, and/or a BFD-RS of the PSCell was received by the RRC entity 308 of the UE 122, the RRC entity 308 has not been notified of the beam failure in the PSCell. In this case, the notification in Step S1202 may be a notification indicating the beam failure in the PSCell.

Another example of the determination in Step S1200 will be described. In a case that a value of BFI_COUNTER of the PSCell is equal to or greater than beamFailureInstanceMaxCount and the SCG is deactivated, the MAC entity 302 of the UE 122 may determine whether to provide a notification to the RRC entity 308 based on the fact that, since the last time the SCG was deactivated and a notification of a change in configurations of beamFailureDetectionTimer, beamFailureInstanceMaxCount, and/or a BFD-RS of the PSCell was received by the RRC entity 308 of the UE 122, the RRC entity 308 has not been notified of the beam failure in the PSCell. In this case, the notification in Step S1202 may be a notification indicating the beam failure in the PSCell.

Further, in the above description, the change in the configuration of the BFD-RS of the PSCell in the deactivated state of the SCG may be made by using the radio link monitoring configuration or a TCI information element included in a message related to reconfiguration of an RRC connection including the configuration on the SCG side. Furthermore, in the above description, "change in configuration" may be rephrased as "reconfiguration", and "configuration changed" may be rephrased as "reconfigured".

An example of processing of the terminal apparatus according to the present embodiment will be described with reference to FIG. 13.

Figure 13:
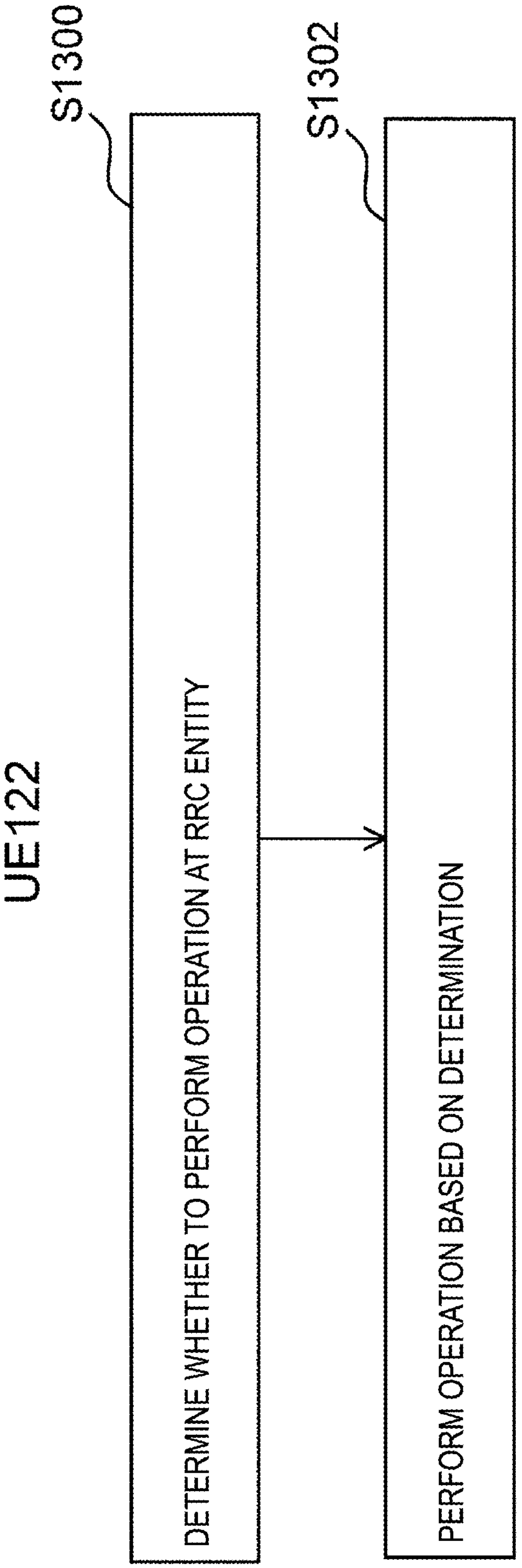
FIG. 13 is an example of processing related to an RRC entity of the terminal apparatus according to the present embodiment.

FIG. 13 is a diagram illustrating an example of processing of the terminal apparatus according to the present embodiment. The RRC entity 308 of the UE 122 determines whether to perform an operation (step S1300) and performs the operation based on the determination (step S1302). The RRC entity 308 may be replaced with the RRC entity 208.

An example of the determination in step S1300 will be described. The RRC entity 308 of the UE 122 may determine whether to perform an operation based on the fact that the MAC entity 302 of the UE 122 has given a notification indicating that beam failure in the PSCell was indicated in the deactivated state of the SCG. In this case, the operation in Step S1302 may be initiating transmission of RRC signaling of E-UTRA indicating SCG failure information (SCGFailureInformationNR) to the eNB 102 in a case that the UE 122 is within the (NG) EN-DC, or may be to initiate transmission of RRC signaling of NR indicating SCG failure information (SCGFailureInformation) to the gNB 108 in a case that the UE 122 is not within the (NG) EN-DC.

As described above in the present embodiment, in a case that a value of BFI_COUNTER of the PSCell is equal to or greater than beamFailureInstanceMaxCount and the SCG is deactivated, the MAC entity of the UE may provide a notification to the RRC entity, the notification indicating the beam failure in the PSCell, based on the fact that the condition of the value of BFI_COUNTER described above being equal to or greater than beamFailureInstanceMaxCount described above is satisfied and the RRC entity has not been notified of the beam failure in the PSCell. As a result, even in a case that beam failure in the PSCell is detected for a second or subsequent time after the SCG is deactivated, it is possible to notify the RRC entity of the beam failure and to efficiently perform necessary signaling.

The radio bearer in the above description may be a DRB, may be an SRB, or may be a DRB and an SRB unless specified otherwise.

In addition, in the above description, expressions such as "notified" and "pointed out" may be used interchangeably.

In addition, in the above description, expressions such as "link", "correspond", and "associate" may be used interchangeably.

In addition, in the above description, expressions such as "included", "being included", and "was included" may be used interchangeably.

In addition, in the above description, "the" may be rephrased as "above-described".

In addition, in the above description, "SpCell of the SCG" may be rephrased as the "PSCell".

In addition, in the above description, expressions such as "determined that", "configured with" and "including" may be used interchangeably.

In the above description, the "dormant state" may be rephrased as the "deactivated state", and the "state resumed from the dormant state" may be rephrased as the "activated state". In addition, in the above description, "activated" and "deactivated" may be rephrased as the "activated state" and the "deactivated state", respectively.

In the above description, "transition from X to Y" may be rephrased as "change from X to Y". In addition, in the above description, "transition" may be rephrased as "determine transition".

In addition, in the example of each processing or the example of the flow of each processing in the above description, some or all of the steps need not be performed. In addition, in the example of each processing or the example of the flow of each processing in the above description, order of the steps may vary. In addition, in the example of each processing or the example of the flow of each processing in the above description, some or all of the processing operations in each step need not be performed. In addition, in the example of each processing or the example of the flow of each processing in the above description, order of processing operations in each step may vary. In addition, in the above description, "perform B based on being A" may be replaced with "perform B". In other words, "perform B" may be performed independently of "being A".

Further, in the above description, "A may be rephrased as B" may include the meaning that B is rephrased as A in addition to rephrasing A as B. In addition, in a case that the above description contains "C may be D" and "C may be E", it may include "D may be E". In addition, in a case that the above description contains "F may be G" and "G may be H", it may include "F may be H".

In addition, in a case that a condition "A" and a condition "B" are conflicting conditions in the above description, the condition "B" may be expressed as "other" condition of the condition "A".

A program running on an apparatus according to the present embodiment may serve as a program that controls a Central Processing Unit (CPU) and the like to cause a computer to function in such a manner as to realize the functions of the present embodiment. Programs or information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Further, some of the apparatuses in the above-described embodiment may be enabled by a computer. In this case, a program for implementing this control function may be implemented by recording the program in a computer-readable recording medium and causing a computer system to read and perform the program recorded in the recording medium. It is assumed that the "computer system" refers to a computer system built into the apparatuses, and the computer system includes an operating system and hardware such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically stores a program for a short period of time, such as a communication line in a case that the program is transmitted via a network such as the Internet or via a communication line such as a telephone line, and a medium that stores the program for a certain period of time, such as a volatile memory inside the computer system that is a server or a client in this case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that a circuit integration technology appears that replaces the present integrated circuits as the semiconductor technology advances, it is also possible to use an integrated circuit based on the technology.

Further, the present embodiment is not limited to the above-described embodiments. Although apparatuses have been described as an example in the embodiments, the present embodiment is not limited thereto, and is applicable to a stationary type or a non-movable type electronic device installed indoors or outdoors such as a terminal apparatus or a communication apparatus, for example, an AV device, a kitchen device, a cleaning or washing machine, an air-conditioning device, office equipment, a vending machine, and other household appliances.

Although the embodiments have been described in detail above referring to the drawings, the specific configuration is not limited to the embodiments and includes design changes within the scope that does not depart from the gist of the embodiments. Furthermore, the present embodiment can be variously modified within the scope of the claims, and embodiments that are made by suitably combining technical means disclosed according to the different embodiments are also included in the technical scope of the present embodiment. In addition, a configuration in which components described in the embodiments described above having similar effects so as to be interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

- 100 E-UTRA
- 102 eNB
- 104 EPC
- 106 NR
- 108 gNB
- 110 5GC
- 112, 114, 116, 118, 120, 124 Interface
- 122 UE
- 200, 300 PHY
- 202, 302 MAC
- 204, 304 RLC
- 206, 306 PDCP
- 208, 308 RRC
- 310 SDAP
- 210, 312 NAS
- 500, 604 Receiver
- 502, 602 Processing unit
- 504, 600 Transmitter

The invention claimed is:

1. A terminal apparatus for communicating with a base station apparatus, the terminal apparatus comprising:

processing circuitry configured to perform communication by using an MCG and an SCG; and a transmitter configured to transmit signaling to the base station apparatus, wherein the SCG includes at least a PSCell, the processing unit circuitry performs processing at a MAC entity and processing at an RRC entity, in a case that a value of BFI_COUNTER of the PSCell is equal to or greater than a first parameter and the SCG is deactivated, the MAC entity determines whether a beam failure in the PSCell has been indicated to the RRC entity since a last reconfiguration of a BFD-RS of the PSCell by the RRC entity, and provides an indication of the beam failure in the PSCell to the RRC entity based on a determination that the beam failure in the PSCell has not been indicated to the RRC entity since the last reconfiguration of the BFD-RS of the PSCell by the RRC entity, the RRC entity determines whether the indication has been received from the MAC entity, and initiates transmission of signaling indicating SCG failure information to the base station apparatus, based on a determination that the indication has been received from the MAC entity, and the first parameter is a threshold configured by the base station apparatus and used in beam failure detection.

2. A method for a terminal apparatus for communicating with a base station apparatus, the method comprising:

performing communication by using an MCG and an SCG, wherein the SCG includes at least a PSCell, in a case that a value of BFI_COUNTER of the PSCell is equal to or greater than a first parameter and the SCG is deactivated, the MAC entity determines whether a beam failure in the PSCell has been indicated to the RRC entity since a last reconfiguration of a BFD-RS of the PSCell by the RRC entity, and provides an indication of the beam failure in the PSCell to the RRC entity based on a determination that the beam failure in the PSCell has not been indicated to the RRC entity since the last reconfiguration of the BFD-RS of the PSCell by the RRC entity, the RRC entity determines whether the indication has been received from the MAC entity, and initiates transmission of signaling indicating SCG failure information to the base station apparatus, based on a determination that the indication has been received from the MAC entity, and the first parameter is a threshold configured by the base station apparatus and used in beam failure detection.

3. An integrated circuit mounted on a terminal apparatus for communicating with a base station apparatus, the integrated circuit performing communication by using an MCG and an SCG, wherein the SCG includes at least a PSCell, the integrated circuit causes the terminal apparatus to provide indications of in a case that a value of BFI_COUNTER of the PSCell is equal to or greater than a first parameter and the SCG is deactivated, determining, by the MAC entity, whether a beam failure in the PSCell has been indicated to the RRC entity since a last reconfiguration of a BFD-RS of the PSCell by the RRC entity, and providing, by the MAC entity, an indication of the beam failure in the PSCell to the RRC entity based on a determination that the beam failure in the PSCell has not been indicated to the RRC entity since the last reconfiguration of the BFD-RS of the PSCell by the RRC entity, and determining, by the RRC entity, whether the indication has been received from the MAC entity, and initiating, by the RRC entity, transmission of signaling indicating SCG failure information to the base station apparatus, based on a determination that the indication has been received from the MAC entity, and the first parameter is a threshold configured by the base station apparatus and used in beam failure detection.

* * * * *